United States Patent
Morgan-Mar et al.

(10) Patent No.: US 8,989,517 B2
(45) Date of Patent: Mar. 24, 2015

(54) BOKEH AMPLIFICATION

(71) Applicant: Canon Kabushiki Kaisha, Tokyo (JP)

(72) Inventors: David Peter Morgan-Mar, Wollstonecraft (AU); Kieran Gerard Larkin, Putney (AU); Matthew Raphael Arnison, Umina Beach (AU)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 14/079,481

(22) Filed: Nov. 13, 2013

(65) Prior Publication Data

US 2014/0152886 A1 Jun. 5, 2014

(30) Foreign Application Priority Data

Dec. 3, 2012 (AU) ................................ 2012258467

(51) Int. Cl.
  *G06K 9/36* (2006.01)
  *G06K 9/40* (2006.01)
  *H04N 5/225* (2006.01)
  *H04N 5/228* (2006.01)
  *H04N 5/262* (2006.01)
  *H04N 5/232* (2006.01)

(52) U.S. Cl.
  CPC ................................ *H04N 5/23212* (2013.01)
  USPC ...................... 382/280; 348/207.1; 348/222.1; 348/239; 382/255; 382/276

(58) Field of Classification Search
  USPC ............... 348/207.1–207.11, 208.99–208.16, 348/222.1, 239, 241, 345–357, 362–368
  See application file for complete search history.

(56) References Cited

U.S. PATENT DOCUMENTS

| 7,065,256 | B2 | 6/2006 | Alon et al. | |
|---|---|---|---|---|
| 8,422,827 | B2 * | 4/2013 | Ishii et al. | 382/299 |
| 8,498,483 | B2 * | 7/2013 | Noguchi et al. | 382/181 |
| 8,624,986 | B2 * | 1/2014 | Li | 348/208.13 |
| 8,704,909 | B2 * | 4/2014 | Kanaris et al. | 348/222.1 |
| 8,737,756 | B2 * | 5/2014 | Daneshpanah et al. | 382/255 |

(Continued)

FOREIGN PATENT DOCUMENTS

WO 2008/149363 A2 12/2008

OTHER PUBLICATIONS

Bae, Soonmin, and Durand, Frédo. "Defocus Magnification." Computer Graphics Forum: Proceedings of Eurographics 2007, Prague, Sep. 3-7, 2007. Ed. Cohen-Or, D and Slavik, P. Oxford, UK: Blackwell Publishing, 2007. 26.3:571-579.

(Continued)

*Primary Examiner* — Michael Osinski
(74) *Attorney, Agent, or Firm* — Canon U.S.A., Inc. IP Division

(57) ABSTRACT

A method of modifying the blur in at least a part of an image of a scene captures at least two images of the scene with different camera parameters to produce a different amount of blur in each image. A corresponding patch in each of the captured images is selected each having an initial amount of blur is used to calculate a set of frequency domain pixel values from a function of transforms of the patches. Each of the pixel values in the set are raised to a predetermined power, forming an amplified set of frequency domain pixel values. The amplified set of frequency domain pixel values is combined with the pixels of the patch in one of the captured images to produce an output image patch with blur modified relative to the initial amount of blur in the image patch.

15 Claims, 13 Drawing Sheets

(56) References Cited

U.S. PATENT DOCUMENTS

| | | | |
|---|---|---|---|
| 2001/0008418 A1* | 7/2001 | Yamanaka et al. | 348/222 |
| 2002/0145671 A1* | 10/2002 | Alon et al. | 348/241 |
| 2003/0002746 A1* | 1/2003 | Kusaka | 382/255 |
| 2007/0036427 A1* | 2/2007 | Nakamura et al. | 382/154 |
| 2008/0013861 A1* | 1/2008 | Li et al. | 382/286 |
| 2008/0175508 A1* | 7/2008 | Bando et al. | 382/255 |
| 2009/0115860 A1* | 5/2009 | Nakashima et al. | 348/208.99 |
| 2009/0141163 A1 | 6/2009 | Attar et al. | |
| 2009/0297056 A1* | 12/2009 | Lelescu et al. | 382/261 |
| 2011/0033132 A1* | 2/2011 | Ishii et al. | 382/275 |
| 2011/0090352 A1* | 4/2011 | Wang et al. | 348/208.6 |
| 2011/0205382 A1* | 8/2011 | Kanaris et al. | 348/222.1 |
| 2012/0206630 A1* | 8/2012 | Nguyen et al. | 348/241 |
| 2013/0063566 A1* | 3/2013 | Morgan-Mar et al. | 348/46 |
| 2013/0266210 A1* | 10/2013 | Morgan-Mar et al. | 382/154 |

OTHER PUBLICATIONS

Kubota, Akira, and Aizawa, Kiyoharu. "Reconstructing Arbitrarily Focused Images From Two Differently Focused Images Using Linear Filters." IEEE Transactions on Image Processing 14.11 (2005): 1848-1859.

* cited by examiner

BOKEH AMPLIFICATION

REFERENCE TO RELATED PATENT APPLICATION(S)

This application claims the benefit under 35 U.S.C. §119 of the filing date of Australian Patent Application No. 2012258467, filed Dec. 3, 2012, hereby incorporated by reference in its entirety as if fully set forth herein.

TECHNICAL FIELD

The current invention relates to digital image processing and, in particular, to rendering a photographic image with modified blur characteristics.

BACKGROUND

Single-lens reflex (SLR) and digital single-lens reflex (DSLR) cameras have large aperture optics which can produce a narrow depth of field. Depth of field measures the distance from the nearest object to the camera which is in focus, to the farthest object from the camera which is in focus. (D)SLR cameras typically have a depth of filed of order significantly less than 1 meter for a typical portrait scenario of a subject a few meters from the camera. This allows the foreground subject of a photo to be rendered in sharp focus, while the background is blurred by defocus. The result is visually pleasing as it provides a separation between the subject and any distracting elements in the background. The aesthetic quality of background blur (encompassing both the quantity and "look" of the blur) is known as bokeh. Bokeh is especially important for photos of people, or portraits.

Compact digital cameras are more popular than DSLRs with consumers because of their smaller size, lighter weight, and lower cost. However, the smaller optics on a compact camera produce a large depth of field, of order greater than approximately 1 meter for the same typical portrait scenario, which renders the background in typical portrait shots as sharp and distracting.

Depth of field varies significantly depending on the geometry of the photographic scene. The following examples are for taking a photo of a person about 3 meters from the camera:

(i) the depth of field for a full frame SLR camera at 50 mm focal length and aperture f/2.8 is about 0.5 meters. For a portrait scenario, a photographer would typically want to use a depth of field this size, or even smaller, maybe 0.2 meters or even 0.1 meters. An SLR camera can also be configured with a smaller aperture to achieve very large depth of field, though this is not usually done for portraits.

(ii) the depth of field for a small compact camera (e.g. Canon™ IXUS™ model) at 50 mm full-frame equivalent focal length and aperture f/2.8, is 6 meters.

(iii) a large compact camera (e.g. Canon™ G12) at 50 mm full-frame equivalent focal length and aperture f/4 is 1.6 meters. (This camera cannot achieve f/2.8 aperture—if it could, its depth of field would be 1.2 meters.) It is practically impossible for a camera with a compact form factor to achieve a depth of field under about 1 meter, for a subject at 3 meters distance. Technically, such is possible, but would require very large and expensive lenses. Depth of field for compact cameras under normal conditions can easily be tens of meters or even infinity, meaning that everything from the subject to the far distance is in focus.

If the person is closer to the camera than 3 meters, all the depth of field distances discussed above will be smaller, and if the person is further away, they will all be larger. Importantly, an SLR camera will always be able to achieve a significantly smaller depth of field than a compact camera. The depth of field is largely dictated by the size of the camera sensor.

A method of producing artificial bokeh with a compact camera, mimicking the amount and quality of background blur produced by an SLR camera, would provide a major improvement in image quality for compact camera users.

Camera manufacturers and professional photographers have recognised the depth of field limitations of small format cameras for decades. With the advent of digital camera technology, it has become feasible to process camera images after capture to modify the appearance of the photo. The generation of SLR-like bokeh from compact camera images has been an early target for research in the field of digital camera image processing. However, no solution providing results of high (i.e. visually acceptable) aesthetic quality has been demonstrated.

To accurately mimic small depth of field given a large depth of field photo, objects in the image must be blurred by an amount that varies with distance from the camera. The most common prior approach tackles this problem in two steps:

(1a). Estimate the distance of regions in the image from the camera to produce a depth map.

(1b). Apply a blurring operation using a blur kernel size that varies with the estimated distance.

Step (1a) is a difficult problem in itself, and the subject of active research by many groups. The three main methods of depth map estimation from camera images (i.e. excluding active illumination methods) are:

(i) Stereo: taking photos from different camera positions and extracting depth from parallax. A major disadvantage of this approach is the requirement to take photos from multiple viewpoints, making it impractical for compact cameras.

(ii) Depth from focus (DFF): taking a series of many images focused at different distances and measuring in patches which photo corresponds to a best focus at that patch, usually using maximal contrast as the best focus criterion. A major disadvantage of this approach is that many exposures are required, necessitating a long elapsed time. During the exposures the camera or subject may inadvertently move, potentially blurring the subject and introducing additional problems caused by image misalignment.

(iii) Depth from defocus (DFD): quantifying the difference in amount of blur between two images taken with different focus and equating the blur difference to a distance. This is the most suitable approach for implementation in a compact camera, as it does not require stereo camera hardware and can be performed with as few as two photos. However, it has the disadvantages that accuracy is typically relatively low, particularly around the boundaries of objects in the scene, and that consistency is adversely affected by differing object textures in the scene. Some DFD methods show better accuracy around object edges, at the cost of using computationally expensive algorithms unsuited to implementation in camera hardware.

Step (1b) is computationally expensive for optically realistic blur kernel shapes. A fallback is to use a Gaussian blur kernel, which produces a blur that looks optically unrealistic, making the resulting image aesthetically unpleasing.

To more easily approach artificial bokeh, many prior methods use a simplified version of the above two-step method, being:

(2a). Segment the image into a foreground region and a background region.

(2b). Apply a constant blurring operation to the background region only.

Assuming step (2a) is done correctly, step (2b) is straightforward. However, step (2a) is still difficult and has not been achieved satisfactorily within the constraints of a compact camera. In particular, the accuracy of segmentation around the edges of objects at different depths in the scene is poor. Even if this simplified method can be achieved without error, the resulting images can look artificial, since intermediate levels of blur between the foreground and background will be absent.

An alternative approach to artificial bokeh is to:
(3a). Estimate the amount of blur at different places in an image, compared to a blur-free representation of the subject scene.
(3b). Apply a blurring operation using a blur kernel size that varies with the estimated blur amount.

A compact camera does not have an infinite depth of field, so the background will show a small amount of blurring relative to an in-focus foreground object. If such blurred regions can be identified accurately, they can be blurred more, producing increased blur in the background.

Step (3a) can be performed with a single image, or by using multiple images of the scene captured with different camera parameters. Estimating blur from a single image is underconstrained and can only be achieved under certain assumptions. For example, one assumption is that edges detected in the image are step function edges in the scene, blurred by the camera optics, and that regions away from edges may be accurately infilled from the edge blur estimates. These assumptions are often false, resulting in poor blur estimates. Estimating blur from multiple images is akin to DFF or DFD, because blur amount is directly related to depth, and shares the same problems.

SUMMARY

According to the present disclosure there is provided a method of modifying the blur in at least a part of an image of a scene, sa d method comprising: capturing at least two images of the scene, said images being captured with different camera parameters to produce a different amount of blur in each of the captured images; selecting a corresponding image patch in each of the captured images, each of the selected image patches having an initial amount of blur; calculating a set of frequency domain pixel values from a combined function of Fourier transforms of two of the selected image patches; raising each of the pixel values in the set of frequency domain pixel values to a predetermined power, thereby forming an amplified set of frequency domain pixel values; and combining the amplified set of frequency domain pixel values with the pixels of the selected image patch in one of the captured images to produce an output image patch with blur modified with respect to the initial amount of blur in the image patch, wherein the amount of modification with respect to blur varies across different regions of the image patch.

Preferably, the set of frequency domain pixel values are modified before being raised to the predetermined power. Generally the modification includes a median filtering operation. Alternatively the modification may include a smoothing filtering operation. The modification may include a normalisation operation and/or a weighting operation. The weights for the weighting operation are determined by the phases of the set of frequency domain pixel values.

Typically the at least two images of the scene are divided into a plurality of corresponding image patches in each of the captured images; and the output image patches are combined to produce an output image. Desirably the plurality of corresponding image patches in each of the captured images form a tiling substantially covering the area of the captured images, and the output image is formed by tiling the output image patches. Generally the plurality of corresponding image patches in each of the captured images overlap, and the output image is formed by combining the pixel values of the output image patches.

In a specific implementation the plurality of corresponding image patches in each of the captured images cover part of the area of the captured images; and the output image patches are combined with the area of at least one of the captured images not covered by the plurality of corresponding image patches to produce an output image. Desirably at least part of the area of the at least one of the captured images not covered by the plurality of corresponding image patches is blurred by convolution with a blur kernel.

According to another aspect, disclosed is a camera comprising an image capture system coupled to memory in which captured images are stored, a processor, and a program executable by the processor to modify the blur in at least a part of an image of a scene, said program comprising: code for causing the capture system to capture at least two images of the scene, said images being captured with different camera parameters to produce a different amount of blur in each of the captured images; code for selecting a corresponding image patch in each of the captured images, each of the selected image patches having an initial amount of blur; code for calculating a set of frequency domain pixel values from a combined function of Fourier transforms of two of the selected image patches; code for raising each of the pixel values in the set of frequency domain pixel values to a predetermined power, thereby forming an amplified set of frequency domain pixel values; and code for combining the amplified set of frequency domain pixel values with the pixels of the selected image patch in one of the captured images to produce an output image patch with blur modified with respect to the initial amount of blur in the image patch, wherein the amount of modification with respect to blur varies across different regions of the image patch.

Another aspect is a camera system comprising: a lens formed of optics producing a relatively large depth of field; a sensor configured capture an image of a scene focussed through the lens; a memory in which images captured by the sensor are stored; a capture mechanism configured to capture at least two images of the scene with different capture parameters and to store the images in the memory; a processor; a program stored in the memory and executable by the processor to modify blur in at least a part of one of the captured images of the scene, said program comprising: code for causing the capture system to capture at least two images of the scene with different camera parameters to produce a different amount of blur in each of the captured images; code for selecting a corresponding image patch in each of the captured images, each of the selected image patches having an initial amount of blur; code for calculating a set of frequency domain pixel values from a combined function of Fourier transforms of two of the selected image patches; code for raising each of the pixel values in the set of frequency domain pixel values to a predetermined power, thereby forming an amplified set of frequency domain pixel values; and code for combining the amplified set of frequency domain pixel values with the pixels of the selected image patch in one of the captured images to produce an output image patch with blur modified with respect to the initial amount of blur in the image patch, wherein the amount of modification with respect to blur varies across different regions of the image patch.

In another aspect disclosed is a computer readable storage medium having a program recorded thereon, the program being executable by a processor to modify blur in at least a part of an image of a scene, the program comprising: code for receiving at least two images of the scene, said images being captured with different camera parameters to produce a different amount of blur in each of the captured images; code for selecting a corresponding image patch in each of the captured images, each of the selected image patches having an initial amount of blur; code for calculating a set of frequency domain pixel values from a combined function of Fourier transforms of two of the selected image patches; code for raising each of the pixel values in the set of frequency domain pixel values to a predetermined power, thereby forming an amplified set of frequency domain pixel values; and code for combining the amplified set of frequency domain pixel values with the pixels of the selected image patch in one of the captured images to produce an output image patch with blur modified with respect to the initial amount of blur in the image patch, wherein the amount of modification with respect to blur varies across different regions of the image patch.

Other aspects are disclosed.

BRIEF DESCRIPTION OF THE DRAWINGS

At least one embodiment of the invention will now be described with reference to the following drawings, in which.

DETAILED DESCRIPTION INCLUDING BEST MODE

Introduction

The present disclosure is directed to providing methods of rendering a photographic image taken with large depth of field so as to mimic a photo taken with a smaller depth of field by modifying blur already present in the image taken with a large depth of field. The methods seek to offer one or more of improved accuracy, improved tolerance to imaging noise, improved tolerance to differences of object texture in the image, and improved aesthetic appearance of the final image, all of these particularly in regions at and near the boundaries of objects in the scene.

Context

Thin Lens Equation, Basic Geometry

The technical details of accurately rendering artificial bokeh rely on key aspects of the geometry and optics of imaging devices. Most scenes that are captured using an imaging device, such as a camera, contain multiple objects, which are located at various distances from the lens of the device. Commonly, the imaging device is focused on an object of interest in the scene. The object of interest shall be referred to as the subject of the scene. Otherwise, objects in the scene, which may include the subject, shall simply be referred to as objects.

Figure 1:
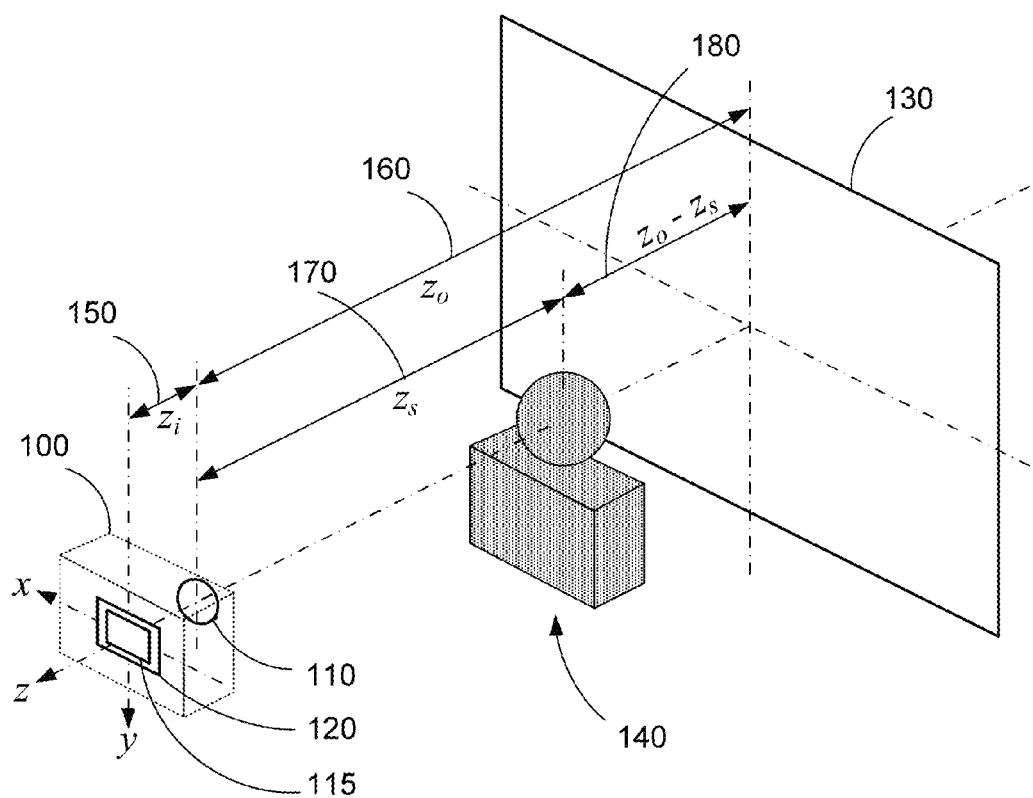
FIG. 1 is a schematic diagram of a scene and an image capture device positioned to capture an image of the scene.
Figure 2:
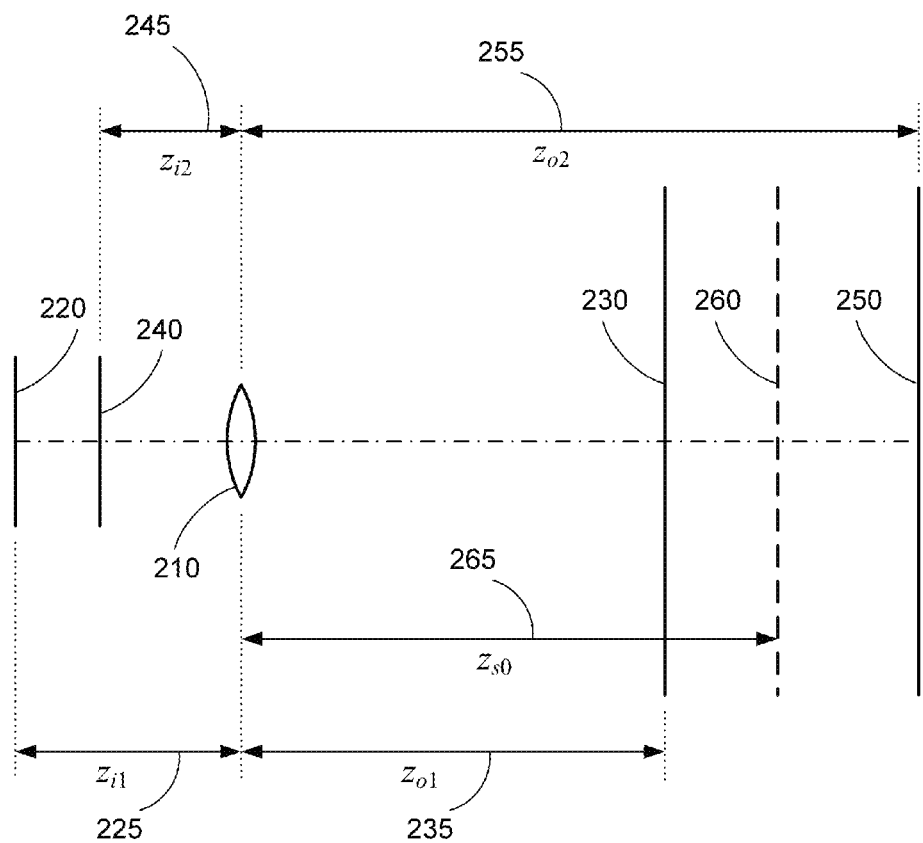
FIG. 2 is a schematic diagram illustrating the geometry of a lens forming two different images at two different focal planes.

FIG. 1 is a schematic diagram showing the geometrical relationships between key parts of an imaging device and objects in a scene to be captured. FIG. 1 shows an imaging device or system (e.g. a camera) 100 which includes a lens 110, and a sensor 115. For the purposes of this description, the camera 100 is typically a compact digital camera and the lens 110 has relatively small optics producing a large depth of field, particularly in comparison to an SLR camera. FIG. 1 also shows an in-focus plane 130 and a general object 140 formed by sphere positioned upon a rectangular prism, forming part of the scene but not necessarily the subject of the scene to be captured. The image plane 120 of the imaging device 100, also referred to as the focal plane, is defined to be at the location of the sensor 115. When projected through the lens 110, the image plane 120 forms the in-focus plane 130, which can be considered to be a virtual plane in the geometrical region of the object 140. A distance 150 from the lens 110 to the image plane 120 is related to a distance 160 from the lens 110 to the in-focus plane 130, by the thin lens law according to the equation $$\frac{1}{z_i} + \frac{1}{z_o} = \frac{1}{f} \quad (1)$$

where f is the focal length of the lens 110, $z_i$ is the lens-to-sensor distance 150, and $z_o$ is the distance 160 from the lens 110 to the in-focus plane 130. The general scene object 140 is located at a distance 170 from the lens 110 and at a distance 180 from the in-focus plane 130. This distance 170 is referred to as $z_s$. The distance 180 from the object 140 to the in-focus plane 130 is given by $z_s - z_o$ and may be positive, zero, or negative. If the object 140 is focused onto the image plane 120, then $z_s = z_o$ and the object 140 is located in the in-focus plane 130. If $z_s$ is less than or greater than $z_o$, then the object 140 is located behind or in front of the in-focus plane 130 respectively, and the image of the object 140 will appear blurred on the image plane 120.

FIG. 1 illustrates a relatively simple geometrical optics model of imaging. This model relies on approximations including the thin lens approximation, paraxial imaging rays, and a lens free of aberrations. These approximations ignore some aspects of the optics that are inherent in actual imaging systems, but are sufficient for general understanding of imaging behaviour, as is understood by those skilled in the art.

Focusing is carried out either manually by the user or by using an autofocus mechanism that is built into the imaging device 100. Focusing typically manipulates the lens-to-sensor distance 150 in order to place the in-focus plane 130 such that the distance $z_o$ 160 is equal to the distance $z_s$ 170 to a specific object of interest, i.e. to place the subject in the in-focus plane 130. Other objects in the scene that have a distance $z_s$ from the lens 110 that is different from that of the subject are located either behind or in front of the in-focus plane 130. These other objects will appear blurred to some degree on the image plane 120 and thus in the image captured on the sensor 115. This blur is referred to as defocus blur.

Defocus Blur

The amount of defocus blurring of an imaged object 140 increases with the distance 180 of the object 140 from the in-focus plane 130. The amount of defocus blur present in a given patch or portion of a captured 2D image can be characterised by the point spread function (PSF). The PSF is the response of the imaging system to a point source, defined such that the integral of the PSF over the image plane is equal to unity. The PSF of an optical system is generally a spatially restricted two-dimensional function of spatial coordinates (x, y) that approaches zero beyond a certain radial distance from the origin. The amount of blur can be characterised by measures of the shape of the PSF. Typical measures of the amount of blur are the full-width-at-half-maximum (FWHM) of the PSF, or the standard deviation of the PSF.

A basic understanding of the principles behind image blurring may be gained by assuming a mathematically simple model for the PSF of a camera lens 110. To achieve this simplicity, prior art analyses often model the PSF as a two-dimensional Gaussian function. This assumption is followed in the present description for explanatory purposes only, noting that the PSFs of physical optical systems are typically not well approximated by Gaussian functions. Under this assumption, the standard deviation a of the Gaussian can be regarded as a blur radius, providing a convenient quantitative measure of the concept of "amount of blur". It can be shown that the relationship of the Gaussian blur radius σ, object distance $z_s$ and the camera image capture parameters of focal length f and lens aperture $A_v$ is given by $$z_s = \frac{fz_i}{z_i - f - 2\sigma A_V} \quad (2)$$

where $A_v$ is the relative aperture (also known as the f-number) of the lens 110. If the blur radius σ of a point located at pixel coordinates $(x_i, y_i)$ in a captured image of a scene can be measured, the distance $z_s$ to an object at the corresponding point in the scene can be determined using equation (2), provided the remaining quantities in equation (2) are known. Through this relationship, knowledge of the blur radius is effectively equivalent to knowledge of the object depth, since the remaining quantities in equation (2) are usually known.

However, determining the blur radius σ from a single image of a scene without detailed prior knowledge of the scene to be imaged is known to be an unsolvable problem. This is because determining the blur radius σ is not possible from a single image unless details of the unblurred scene image are known. For example, an image feature resembling a blurred disc may be caused by a disc of some indeterminate smaller size that has been blurred by some unknown amount, or by an object in the scene that resembles a blurred disc, rendered in sharp focus. Given this ambiguity, it is impossible to determine the blur radius σ. Thus, in terms of equation (2), even if the parameters $z_i$, f, and $A_v$ are known, it is not possible to determine depth from a single image of an unconstrained scene.

In the majority of circumstances, scenes are imaged without detailed knowledge of the structure of the objects in the scene. It is a general requirement for many imaging applications to work with unconstrained scenes, and even under carefully controlled imaging environments, such as portrait studios, it is very difficult to estimate the required information needed to obtain a depth map from a single image. However, referring to equation (2), it is theoretically possible to extract information about the blur radius (or equivalently the depth) using two captured images of the same scene, provided that the value of at least one of the parameters, in addition to blur radius σ, differs between the two captured images. This is the basic principle that underpins depth from defocus (DFD) methods, which rely on calculating the relative defocus blur between two images of a scene.

Practical Considerations

In practice, images of a scene are captured with some amount of imaging noise. This affects the accuracy of any measurements made by processing the image data. The simple optical models, such as Gaussian PSFs, used to derive the principles of many prior art artificial bokeh methods are not realistic. Real lenses contain aberrations other than defocus, objects are imaged with large field angles, and diffraction effects can be important. There are also considerations of the amount of visual texture in the scene objects. For example, if an area of an object is uniform in colour and reflectivity, then it is impossible to distinguish any amount of blurring within this area. Further, the combination of different visual textures with varying amounts of imaging noise produces widely varying responses for many artificial bokeh methods. Particularly problematical is when different visual textures at the same depth produce different estimates of the amount of blur.

For combinations of these reasons, artificial bokeh methods in practice have shown limited success at rendering enhanced background blur in realistic photographic scenes. Much of the reported success of artificial bokeh methods has been restricted to highly constrained test scenes.

Overview

The arrangements presently described improve on the prior art by utilising more realistic theoretical modelling of the behaviour of lens optics in real world conditions, and by providing a more robust means of rendering enhanced background blur in a scene independent manner and in the presence of imaging noise particularly in regions at and near the boundaries of objects in the scene.

Figures 3A, 3B:
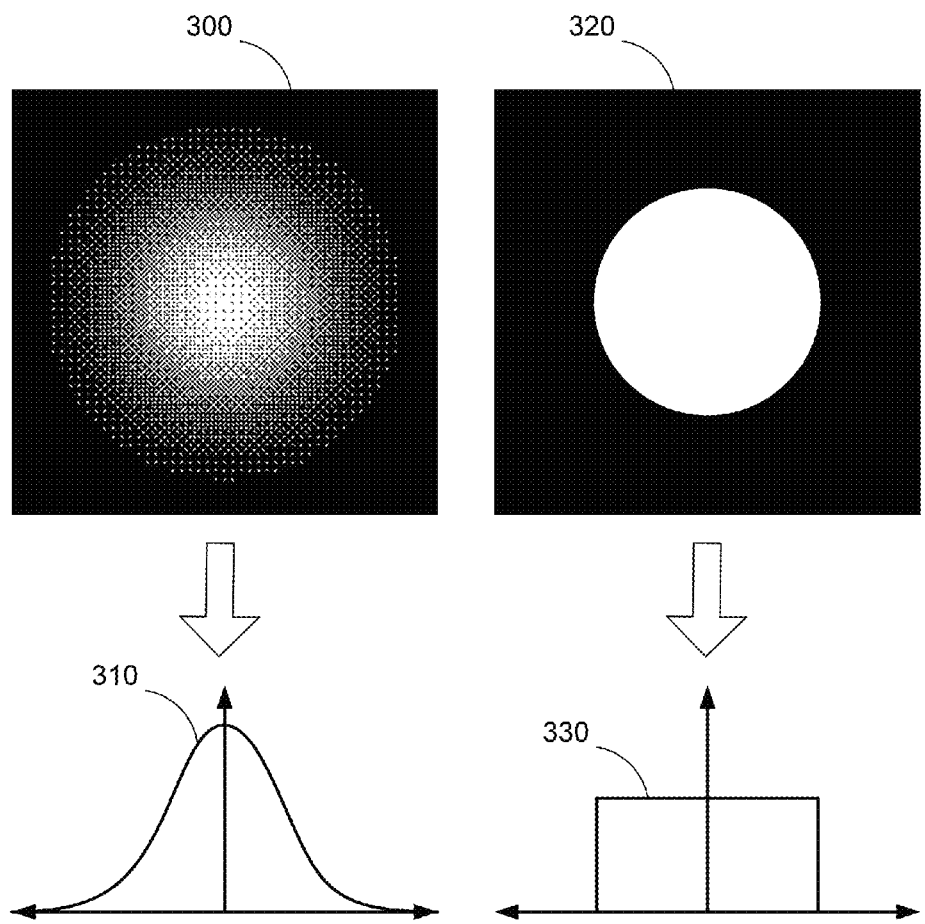
FIGS. 3A and 3B illustrate a two-dimensional Gaussian function and a two-dimensional pillbox function, and one-dimensional cross-sections thereof.

FIGS. 3A and 3B illustrate two simple two-dimensional functions that are commonly assumed as approximations to lens PSFs. FIG. 3A shows a two-dimensional Gaussian function 300, whose one-dimensional cross section is a one-dimensional Gaussian function 310. The two-dimensional Gaussian function 300 is illustrated schematically in a dithered fashion, to assist with photocopy reproduction of this patent specification. FIG. 3B shows a circular pillbox function 320, whose one-dimensional cross section is a square function 330.

Prior art modelling of the lens behaviour in the context of artificial bokeh commonly assumes that the PSF of defocus blur is well modelled by a two-dimensional Gaussian function 300. In general this is not true. The defocus blur PSF of a photographic camera lens often more closely resembles a circular pillbox 320, with relatively sharp edges compared to the gradual fall-off of a Gaussian function. In reality, the shape of the defocus blur PSF is more complex than either of these approximations, and varies significantly from lens to lens and with different camera parameters for a single lens. The PSF also varies with field angle such that the PSF in one region of the image plane 120 may be different to the PSF in some other region of the image plane 120.

Also in particular, prior art modelling of the lens behaviour in the context of artificial bokeh assumes that consideration of the modulation transfer function (MTF), which is the modulus of the optical transfer function (OTF), is adequate to determine accurate blur estimates from a comparison of two images. This assumption neglects the important contribution of the phase of the OTF, effectively disregarding half of the available data. By fully utilising the phase information, the arrangements presently disclosed can achieve significantly more accurate results than the prior art.

The presently disclosed arrangements facilitate artificial bokeh rendering from a pair of images taken of the same scene with different camera parameters: (a) without making any assumption about the shape of the defocus blur PSF, (b) without discarding the information present in the phases of the image spectrum and OTF, and (c) using an improved method of characterising the relative blur between two image patches which is less sensitive to imaging noise than prior methods. These features will be explained in detail in the following sections.

Theory

Spectral Ratio and Relative Point Spread Function

A method of rendering enhanced blur from two images of the same scene can be developed by considering the theory of image formation. Consider a patch $f_0$ of the scene to be imaged, the patch being small enough such that any variation in object depth or PSF of the imaging system within the patch is small and thus can be ignored. The two-dimensional intensity distribution of the corresponding patch of an image $f_1$ of the intensity distribution of the patch $f_0$ can be modelled using a fully general point spread function (PSF) by a spatial convolution operation as follows:

$$f_1(x,y) = f_0(x,y) \otimes PSF_1(x,y) \quad (3)$$

where $PSF_1$ is the defocus blur PSF of the scene patch $f_0$ when it is projected on to the image patch $f_1$. Taking the Fourier transform of both sides of equation (3) gives $$F_1(u,v) = F_0(u,v) OTF_1(u,v) \quad (4)$$

where (u, v) are spatial frequency coordinates, $F_1$ is the Fourier transform of $f_1$, $F_0$ is the Fourier transform of $f_0$, and $OTF_1$ is the Fourier transform of $PSF_1$. By the Fourier convolution theorem the spatial convolution operation has become a product. The function $OTF_1$ is known as the optical transfer function (OTF). The OTF is a complex-valued function, with modulus and phase components.

Assume we have two images of the same scene taken with different camera parameters, but without moving the camera or any objects in the scene so that the images are in alignment with one another. Then the second image patch $f_2$ of the same scene patch $f_0$ may be modelled in the same way as equation (3), replacing the 1 subscripts with 2 subscripts. Taking the ratio of the Fourier transforms of corresponding patches in the two images gives $$\frac{F_1(u,v)}{F_2(u,v)} = \frac{OTF_1(u,v)}{OTF_2(u,v)} \quad (5)$$

where the Fourier transform $F_0(u, v)$ of the scene is common to the numerator and denominator of the right hand side and has been cancelled from the ratio. This ratio may be called the spectral ratio. When no noise is present, the spectral ratio is scene independent because all contributions of the scene have been cancelled out. In the presence of imaging or quantisation noise, the cancellation may not be perfect, and the spectral ratio may be biased by the noise.

The spectral ratio can be formed with an arbitrary assignment of the image patches as $f_1$ and $f_2$. However, as explained further below, it is advantageous to use asymmetric patch selection, based on which of the two image patches $f_1$ and $f_2$ is less blurred than the other image patch. Such a determination can be made by, for example, calculating the variance of the pixel intensities or brightness in each image patch, with the patch with the higher variance deemed to be less blurred, and thus the most focussed representation of the scene. Other methods of determining which patch is less blurred may be used, for example if the images are taken at different apertures and diffraction can be ignored, the patch captured with the narrower aperture may be deemed to be less blurred.

Once determination has been made of which patch is less blurred, the less blurred patch may be assigned as patch $f_2$, with the patch deemed to be more blurred assigned as $f_1$. This assignment allows an interpretation in which it is possible to consider $f_1$ as a more blurred version of $f_2$, related by a relative optical transfer function $OTF_r$ given by the spectral ratio:

$$F_1(u,v) = F_2(u,v) \frac{OTF_1(u,v)}{OTF_2(u,v)} \quad (6)$$
$$= F_2(u,v) OTF_r(u,v)$$

Taking the inverse Fourier transform of equation (6) gives the following relationship $$f_1(x,y) = f_2(x,y) \otimes PSF_r(x,y) \quad (7)$$

where $PSF_r$ is defined to be the relative point spread function (relative PSF) which when convolved with the image patch $f_2$ produces the image patch $f_1$. The relative point spread function $PSF_r$ is not simply related to $PSF_1$ and $PSF_2$, but is the result of a non-linear combination of the two. The relative point spread function $PSF_r$ varies with parameters of the imaging system such as focus and aperture, with the depth of the object imaged in patch $f_0$, and with field angle across the image plane 120.

Application to Artificial Bokeh

The space-varying relative point spread function $PSF_r$ is the inverse Fourier transform of ($OTF_1/OTF_2$). $PSF_r$ operates on the image patch $f_2$ to increase the amount of blur in the image, but in a very specific way:

(a) where an object is in focus in both images (for example, the subject of the photo, usually in the foreground), there is very little blur difference, so the relative PSF is close to a delta function; and (b) where an object is more in focus in $f_2$ than in $f_1$, the relative PSF produces the necessary amount of relative blurring in $f_1$. For objects at distances similar to the subject, this is a small amount of blur, while for objects at distances very different to the subject (e.g. the distant background) this is a larger amount of blur.

The goal of rendering artificial bokeh simulating a shallower depth of field from such a pair of images can be expressed as:

(i) where an object is in focus in both images (e.g. the subject of the photo), do not blur; and (ii) where an object is more in focus in $f_2$ than in $f_1$, apply a variable amount of blurring. For objects at distances similar to the subject, apply a relatively small amount of blur, while for objects at distances very different to the subject (e.g. the distant background) apply a larger amount of blur.

The present inventors observe the similarity in the two sets of points above, and deduce it is possible to achieve the goal of rendering a shallower depth of field image $f_{(N)}$ by applying the relative PSF to the image patch $f_2$ multiple times, in other words by convolving $f_2$ with the relative PSF N times:

$$f_{(N)} = f_2 \otimes \overbrace{PSF_r \otimes PSF_r \otimes \ldots \otimes PSF_r}^{N} \quad (8)$$

Expressed in the Fourier domain, this becomes:

$$F_{(N)} = \left(\frac{OTF_1}{OTF_2}\right)^N F_2 \quad (9)$$

The amount of additional blurring of background regions can be controlled by adjusting the amplification factor N. In the Fourier domain, N is not constrained to being an integer. As long as N>1, the blurring of the background is increased. If N<1, the blurring of the background is reduced; in other words the background is sharpened, mimicking the effect of a greater depth of field than the original images. Equation (9) must be implemented using complex arithmetic to preserve the phase information that is crucial to the reconstruction of an image.

The present inventors have thus determined it is possible to produce a shallow depth of field or artificial bokeh image by dividing the input images into patches $f_1$ and $f_2$, and then, for each patch:

(i) calculate the spectral ratio $F_1/F_2$;

(ii) raise the spectral ratio to some power N>1 and multiply by the patch Fourier transform $F_2$ to obtain the Fourier domain patch $F_{(N)}$; and (iii) inverse Fourier transform the Fourier domain patch $F_{(N)}$ to obtain the output image patch $f_{(N)}$.

The resulting patches may then be reassembled to give the final image, which will appear to be a shallow depth of field image of the scene, with objects away from the focal plane blurred more than in the input images.

Advantageously, the resulting patches produce an image in which objects near the focal plane are not blurred, while objects far from the focal plane are blurred in proportion to their distance from the focal plane. This tends to hold even when a single patch covers objects or parts of objects at multiple distances. The frequency domain information from discrete objects or parts of objects at different distances from the camera, visible in the same patch, tend to separate out into discrete spatial frequencies. Each of the spatial frequencies is amplified independently by an amount required to produce the appropriate amount of blur for an object at the corresponding distance. For spatial frequencies present in multiple discrete objects, the amplification is intermediate, and the combination of other amplified frequencies and the original phase information from patch $F_2$ tends to construct the desired differential blurring appropriately. The result is that a single pair of input patches $f_1$ and $f_2$ covering objects at different distances will produce an output image patch $f_{(N)}$ containing an additional amount of blur that varies across the patch, the variation in additional blur being appropriate for the differing distances of the various objects within the patch.

Normalisation

A complication arises if the mean intensity levels of the two image patches $f_1$ and $f_2$ are not the same as each other. In most cases the mean intensity levels of the two patches will be similar, since the two images will preferentially have been captured with a short time interval between the exposures (for example, typically less than 1 second), and with similar photographic exposures. However due to variations in illumination intensity, motion of objects in the scene, or the effects of imaging noise, the mean intensity levels of the two image patches $f_1$ and $f_2$ are unlikely to be identical. By properties of the Fourier transform, the pixels of the Fourier transforms $F_1$ and $F_2$ corresponding to zero spatial frequency in the Fourier domain (known as the DC pixel) contain a real number equal to the mean intensity level of the corresponding image patches $f_1$ and $f_2$. By the construction of the spectral ratio, the DC pixel of the spectral ratio contains the ratio of the mean intensity levels of the image patches $f_1$ and $f_2$.

In the ideal case in which the image patches $f_1$ and $f_2$ have equal mean intensities, the DC pixel of the spectral ratio is equal to 1. In this case, raising the spectral ratio to a power N will preserve the unity value of the DC pixel. Then when the spectral ratio is multiplied by the Fourier transformed patch $F_2$ to form $F_{(N)}$, the DC value of $F_{(N)}$ will be equal to the DC value of the Fourier transformed patch $F_2$. Then when $F_{(N)}$ is inverse Fourier transformed to form $f_{(N)}$, the resulting artificial bokeh patch will have the same mean intensity level as the original patch $f_2$. If this ideal case holds across all of patches in the original images, then when the artificial bokeh patches are assembled, the intensity of the resulting composite image will be consistent with the original image in all regions.

On the other hand, if the image patches $f_1$ and $f_2$ have unequal mean intensities, the DC pixel of the spectral ratio is not equal to 1. In this case, raising the spectral ratio to a power N will change the value of the DC pixel. Then, when the spectral ratio is multiplied by the Fourier transformed patch $F_2$ to form $F_{(N)}$, the DC value of $F_{(N)}$ will not be equal to the DC value of the Fourier transformed patch $F_2$. Then, when $F_{(N)}$ is inverse Fourier transformed to form $f_{(N)}$, the resulting artificial bokeh patch will have a different mean intensity level compared to the original patch $f_2$. If this more realistic case holds across all of patches in the original images, then when the artificial bokeh patches are assembled, the intensity of the resulting composite image will be inconsistent with the original image. Furthermore, the inconsistencies in mean intensity level will likely vary from patch to patch. The resulting composite image will have a distracting blocky appearance.

To avoid this blocky appearance artifact, the spectral ratio may be normalized by dividing all pixels of the spectral ratio by the DC value of the spectral ratio, before raising it to the power N. This ensures that the mean intensity levels of the patches composing the final output image will be consistent and the resulting composite image will not have this blocky appearance.

Noise Reduction

Digital images are typically subject to imaging noise. The process of raising the spectral ratio to a power may tend to amplify the effects of noise. If noise perturbs the amplitude of a particular spatial frequency to a higher value in the spectral ratio, that noise will be enhanced when the spectral ratio is raised to a power, resulting in increased noise in the final image. It is therefore advantageous to apply one or more noise reduction steps to the processing.

In one implementation, the spectral ratio may be smoothed by a filtering process to remove outlying pixel values before raising to a power, for example using a block-based median filter, a Gaussian filter, or some other smoothing filter. A median filter may operate on complex numbers either by selecting real and imaginary parts independently and combining them to give a complex result, or by selecting a complex value by consideration of the modulus while ignoring the phase.

In another implementation, the spectral ratio may be modified by multiplying the pixel values by a weighting function, which varies from pixel to pixel, before raising to a power. Weights for the weighting operation are determined by the phases of the set of frequency domain pixel values. An example weighting function may be constructed by considering the complex phase value φ of each pixel in the spectral ratio. The complex phase φ0 of each pixel is an angular value which may be mapped on to the range −π to +π radians. An example weighting function W(φ) is then given by $$W(\phi) = \left(\frac{\pi - |\phi|}{\pi}\right)^k \quad (10)$$

where k is a real number. Preferred values of k include 1, 2, and other positive integers. Such a weighting function reduces the amplitude of pixels in the spectral ratio in a manner such that pixels with absolute phase values closer to π have their amplitudes reduced by a greater amount than do pixels with absolute phase values closer to 0. Pixels with absolute phase values approaching π tend to correspond to spatial frequencies with little spectral energy in the original images, meaning the spectral ratio amplitude may be substantially adversely affected by imaging noise. Weighting such pixels with a small weighting value reduces their influence on the final image. Other weighting functions based on the phases of pixels of the spectral ratio may also be used.

In another implementation, the patches selected for processing may overlap, thus producing multiple potential values for output pixels in the final image. The value of each pixel in the final image may be calculated using some combination of the potential values produced by different overlapping patches, for example the mean or the median of the values.

In a further implementation, a combination of the above noise reduction methods may be used. The noise reduction methods provide a further advantage in that they allow better differentiation of blurring amount between objects at different depths than may appear in a single image patch. The use of overlapping patches in particular allows fine detail around the edges of in-focus objects to be rendered accurately.

Processing Speed

To reduce the number of Fourier transforms required and speed up processing, the methods described above may be applied selectively to subregions of the input images. A main advantage of the methods is accuracy of artificial bokeh around the edges of object boundaries. In regions away from object boundaries, alternative methods may provide a speed advantage while not reducing the aesthetic quality of the final output image.

In one implementation, the input images may be segmented into "foreground" and "background" regions. This may be done, for example, by using a known DFD method to produce a depth map, then thresholding to produce a binary segmentation. The "foreground" region should contain objects close to the focal plane, while the "background" region should contain objects far from the focal plane. A "boundary" region may then be defined by selecting pixels within a predetermined distance from the segmentation edge between the foreground and background regions. The foreground region is left unblurred, the background region may be blurred using a large blur kernel, and the boundary region may be rendered using the artificial bokeh methods described above. The three regions may then be composited into a final output image. This provides for an advantageous combination of relatively computationally inexpensive processing for much of the image, with accurate rendering of edges around object boundaries.

EXAMPLE 1

The arrangements presently disclosed may be implemented on a variety of hardware platforms, including in an imaging device such as a camera, or on a general purpose computer (PC), or in a cloud computing implementation. This example relates to a general purpose computing implementation.

Figure 4A:
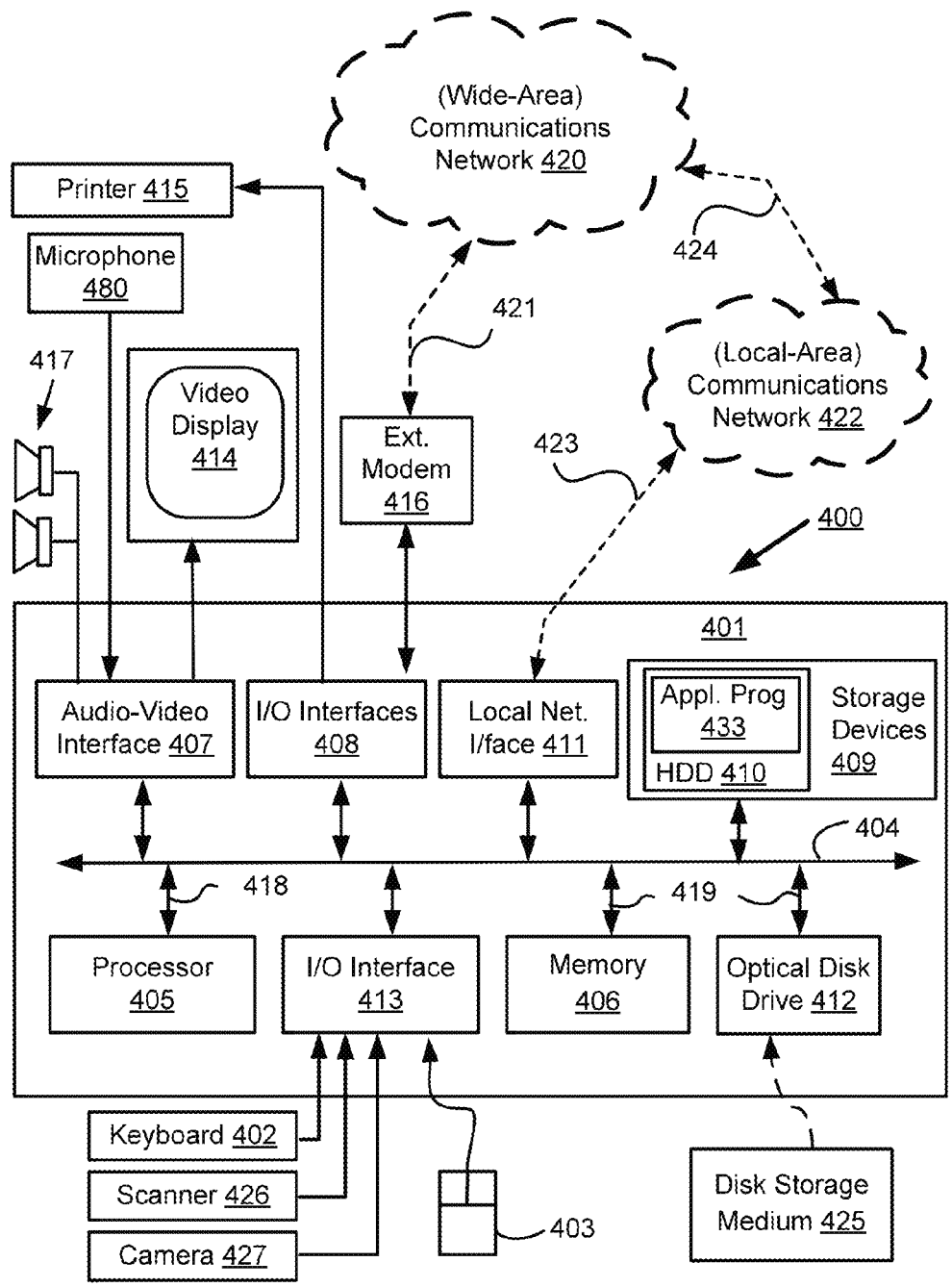
FIGS. 4A and 4B collectively form a schematic block diagram of a general purpose computer on which various implementations may be practised.
Figure 4B:
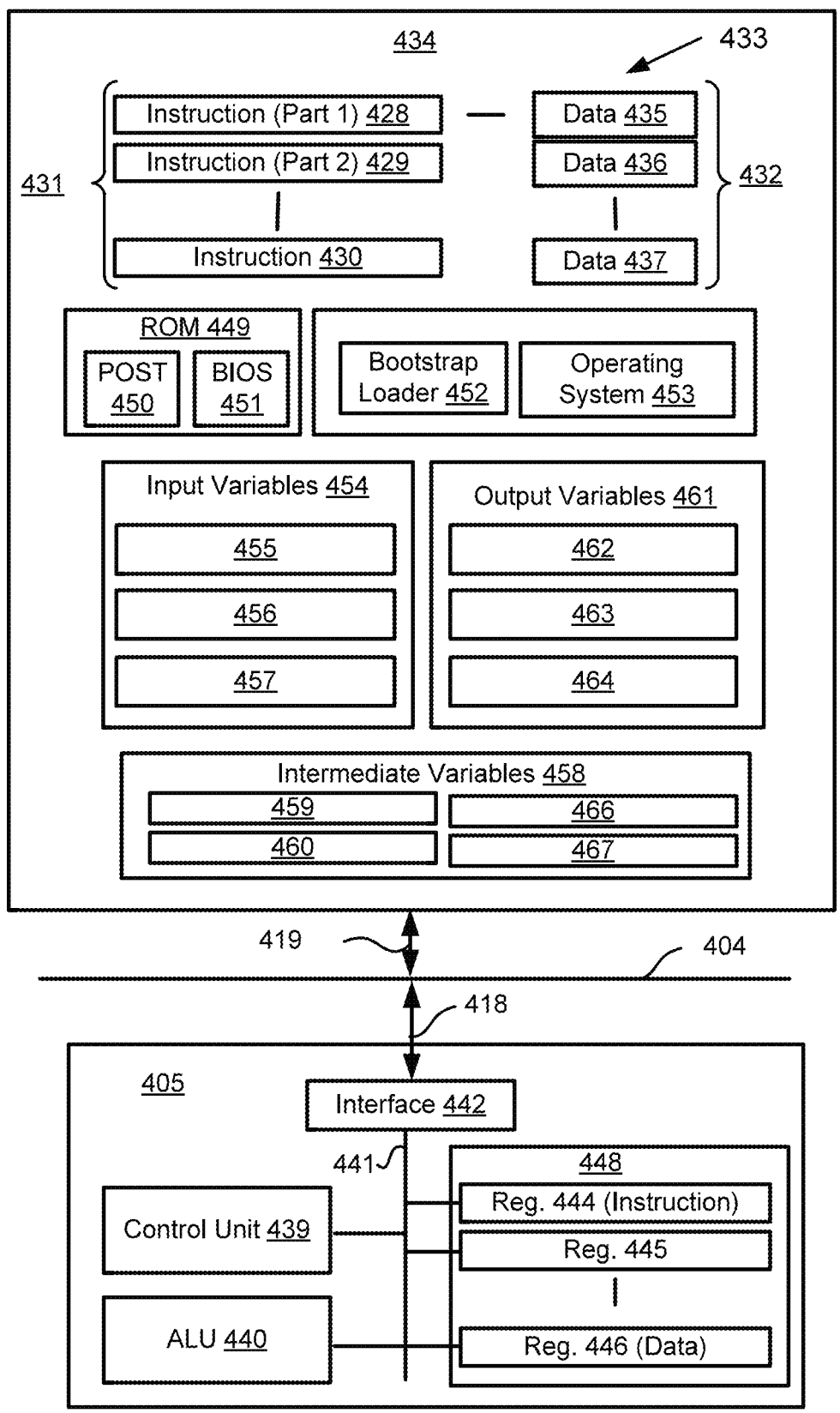

FIGS. 4A and 4B depict a general-purpose computer system 400, upon which the various arrangements described can be practiced.

As seen in FIG. 4A, the computer system 400 includes: a computer module 401; input devices such as a keyboard 402, a mouse pointer device 403, a scanner 426, a camera 427 (such as a compact camera 110), and a microphone 480; and output devices including a printer 415, a display device 414 and loudspeakers 417. An external Modulator-Demodulator (Modem) transceiver device 416 may be used by the computer module 401 for communicating to and from a communications network 420 via a connection 421. The communications network 420 may be a wide-area network (WAN), such as the Internet, a cellular telecommunications network, or a private WAN. Where the connection 421 is a telephone line, the modem 416 may be a traditional "dial-up" modem. Alternatively, where the connection 421 is a high capacity (e.g., cable) connection, the modem 416 may be a broadband modem. A wireless modem may also be used for wireless connection to the communications network 420.

The computer module 401 typically includes at least one processor unit 405, and a memory unit 406. For example, the memory unit 406 may have semiconductor random access memory (RAM) and semiconductor read only memory (ROM). The computer module 401 also includes an number of input/output (I/O) interfaces including: an audio-video interface 407 that couples to the video display 414, loudspeakers 417 and microphone 480; an I/O interface 413 that couples to the keyboard 402, mouse 403, scanner 426, camera 427 and optionally a joystick or other human interface device (not illustrated); and an interface 408 for the external modem 416 and printer 415. In some implementations, the modem 416 may be incorporated within the computer module 401, for example within the interface 408. The computer module 401 also has a local network interface 411, which permits coupling of the computer system 400 via a connection 423 to a local-area communications network 422, known as a Local Area Network (LAN). As illustrated in FIG. 4A, the local communications network 422 may also couple to the wide network 420 via a connection 424, which would typically include a so-called "firewall" device or device of similar functionality. The local network interface 411 may comprise an Ethernet circuit card, a Bluetooth™ wireless arrangement or an IEEE 802.11 wireless arrangement; however, numerous other types of interfaces may be practiced for the interface 411.

The I/O interfaces 408 and 413 may afford either or both of serial and parallel connectivity, the former typically being implemented according to the Universal Serial Bus (USB) standards and having corresponding USB connectors (not illustrated). Storage devices 409 are provided and typically include a hard disk drive (HDD) 410. Other storage devices such as a floppy disk drive and a magnetic tape drive (not illustrated) may also be used. An optical disk drive 412 is typically provided to act as a non-volatile source of data. Portable memory devices, such optical disks (e.g., CD-ROM, DVD, Blu-ray Disc™), USB-RAM, portable, external hard drives, and floppy disks, for example, may be used as appropriate sources of data to the system 400.

The components 405 to 413 of the computer module 401 typically communicate via an interconnected bus 404 and in a manner that results in a conventional mode of operation of the computer system 400 known to those in the relevant art. For example, the processor 405 is coupled to the system bus 404 using a connection 418. Likewise, the memory 406 and optical disk drive 412 are coupled to the system bus 404 by connections 419. Examples of computers on which the described arrangements can be practised include IBM-PC's and compatibles, Sun Sparcstations, Apple Mac™ or a like computer systems.

The methods of artificial bokeh rendering may be implemented using the computer system 400 wherein the artificial bokeh processes of FIGS. 8 to 13, to be described, may be implemented as one or more software application programs 433 executable within the computer system 400. In particular, the steps of the method of artificial bokeh rendering are effected by instructions 431 (see FIG. 4B) in the software 433 that are carried out within the computer system 400. The software instructions 431 may be formed as one or more code modules, each for performing one or more particular tasks. The software may also be divided into two separate parts, in which a first part and the corresponding code modules performs the artificial bokeh rendering methods and a second part and the corresponding code modules manage a user interface between the first part and the user.

The software may be stored in a computer readable medium, including the storage devices described below, for example. The software is loaded into the computer system 400 from the computer readable medium, and then executed by the computer system 400. A computer readable medium having such software or computer program recorded on the computer readable medium is a computer program product. The use of the computer program product in the computer system 400 preferably effects an advantageous apparatus for artificial bokeh rendering.

The software 433 is typically stored in the HDD 410 or the memory 406. The software is loaded into the computer system 400 from a computer readable medium, and executed by the computer system 400. Thus, for example, the software 433 may be stored on an optically readable disk storage medium (e.g., CD-ROM) 425 that is read by the optical disk drive 412. A computer readable medium having such software or computer program recorded on it is a computer program product. The use of the computer program product in the computer system 400 preferably effects an apparatus for artificial bokeh rendering.

In some instances, the application programs 433 may be supplied to the user encoded on one or more CD-ROMs 425 and read via the corresponding drive 412, or alternatively may be read by the user from the networks 420 or 422. Still further, the software can also be loaded into the computer system 400 from other computer readable media. Computer readable storage media refers to any non-transitory tangible storage medium that provides recorded instructions and/or data to the computer system 400 for execution and/or processing. Examples of such storage media include floppy disks, magnetic tape, CD-ROM, DVD, Blu-ray™ Disc, a hard disk drive, a ROM or integrated circuit, USB memory, a magneto-optical disk, or a computer readable card such as a PCMCIA card and the like, whether or not such devices are internal or external of the computer module 401. Examples of transitory or non-tangible computer readable transmission media that may also participate in the provision of software, application programs, instructions and/or data to the computer module 401 include radio or infra-red transmission channels as well as a network connection to another computer or networked device, and the Internet or Intranets including e-mail transmissions and information recorded on Websites and the like.

The second part of the application programs 433 and the corresponding code modules mentioned above may be executed to implement one or more graphical user interfaces (GUIs) to be rendered or otherwise represented upon the display 414. Through manipulation of typically the keyboard 402 and the mouse 403, a user of the computer system 400 and the application may manipulate the interface in a functionally adaptable manner to provide controlling commands and/or input to the applications associated with the GUI(s). Other forms of functionally adaptable user interfaces may also be implemented, such as an audio interface utilizing speech prompts output via the loudspeakers 417 and user voice commands input via the microphone 480.

FIG. 4B is a detailed schematic block diagram of the processor 405 and a "memory" 434. The memory 434 represents a logical aggregation of all the memory modules (including the HDD 409 and semiconductor memory 406) that can be accessed by the computer module 401 in FIG. 4A.

When the computer module 401 is initially powered up, a power-on self-test (POST) program 450 executes. The POST program 450 is typically stored in a ROM 449 of the semiconductor memory 406 of FIG. 4A. A hardware device such as the ROM 449 storing software is sometimes referred to as firmware. The POST program 450 examines hardware within the computer module 401 to ensure proper functioning and typically checks the processor 405, the memory 434 (1409, 406), and a basic input-output systems software (BIOS) module 451, also typically stored in the ROM 449, for correct operation. Once the POST program 450 has run successfully, the BIOS 451 activates the hard disk drive 410 of FIG. 4A. Activation of the hard disk drive 410 causes a bootstrap loader program 452 that is resident on the hard disk drive 410 to execute via the processor 405. This loads an operating system 453 into the RAM memory 406, upon which the operating system 453 commences operation. The operating system 453 is a system level application, executable by the processor 405, to fulfil various high level functions, including processor management, memory management, device management, storage management, software application interface, and generic user interface.

The operating system 453 manages the memory 434 (1409, 406) to ensure that each process or application running on the computer module 401 has sufficient memory in which to execute without colliding with memory allocated to another process. Furthermore, the different types of memory available in the system 400 of FIG. 4A must be used properly so that each process can run effectively. Accordingly, the aggregated memory 434 is not intended to illustrate how particular segments of memory are allocated (unless otherwise stated), but rather to provide a general view of the memory accessible by the computer system 400 and how such is used.

As shown in FIG. 4B, the processor 405 includes a number of functional modules including a control unit 439, an arithmetic logic unit (ALU) 440, and a local or internal memory 448, sometimes called a cache memory. The cache memory 448 typically includes a number of storage registers 444-446 in a register section. One or more internal busses 441 functionally interconnect these functional modules. The processor 405 typically also has one or more interfaces 442 for communicating with external devices via the system bus 404, using a connection 418. The memory 434 is coupled to the bus 404 using a connection 419.

The application program 433 includes a sequence of instructions 431 that may include conditional branch and loop instructions. The program 433 may also include data 432 which is used in execution of the program 433. The instructions 431 and the data 432 are stored in memory locations 428, 429, 430 and 435, 436, 437, respectively. Depending upon the relative size of the instructions 431 and the memory locations 428-430, a particular instruction may be stored in a single memory location as depicted by the instruction shown in the memory location 430. Alternately, an instruction may be segmented into a number of parts each of which is stored in a separate memory location, as depicted by the instruction segments shown in the memory locations 428 and 429.

In general, the processor 405 is given a set of instructions which are executed therein. The processor 405 waits for a subsequent input, to which the processor 405 reacts to by executing another set of instructions. Each input may be provided from one or more of a number of sources, including data generated by one or more of the input devices 402, 403, data received from an external source across one of the networks 420, 422, data retrieved from one of the storage devices 406, 409 or data retrieved from a storage medium 425 inserted into the corresponding reader 412, all depicted in FIG. 4A. The execution of a set of the instructions may in some cases result in output of data. Execution may also involve storing data or variables to the memory 434.

The disclosed artificial bokeh rendering arrangements use input variables 454, which are stored in the memory 434 in corresponding memory locations 455, 456, 457. The arrangements produce output variables 461, which are stored in the memory 434 in corresponding memory locations 462, 463, 464. Intermediate variables 458 may be stored in memory locations 459, 460, 466 and 467.

Referring to the processor 405 of FIG. 4B, the registers 444, 445, 446, the arithmetic logic unit (ALU) 440, and the control unit 439 work together to perform sequences of micro-operations needed to perform "fetch, decode, and execute" cycles for every instruction in the instruction set making up the program 433. Each fetch, decode, and execute cycle comprises:

(a) a fetch operation, which fetches or reads an instruction 431 from a memory location 428, 429, 430;

(b) a decode operation in which the control unit 439 determines which instruction has been fetched; and (c) an execute operation in which the control unit 439 and/or the ALU 440 execute the instruction.

Thereafter, a further fetch, decode, and execute cycle for the next instruction may be executed. Similarly, a store cycle may be performed by which the control unit 439 stores or writes a value to a memory location 432.

Each step or sub-process in the processes of FIGS. 8 to 13 is associated with one or more segments of the program 433 and is performed by the register section 444, 445, 447, the ALU 440, and the control unit 439 in the processor 405 working together to perform the fetch, decode, and execute cycles for every instruction in the instruction set for the noted segments of the program 433.

The method of artificial bokeh techniques may alternatively be implemented in whole or part in dedicated hardware such as one or more integrated circuits performing the functions or sub functions to be described. Such dedicated hardware may include graphic processors, digital signal processors, or one or more microprocessors and associated memories.

In another example, a camera may implement the artificial bokeh algorithmic processes to be described in hardware or firmware in order to capture pairs of images with different camera parameters and to process the captured images to provide images with artificial bokeh. In this case, the camera hardware can include a capture mechanism to capture multiple images of a scene. Where the images are suitable for application of artificial bokeh processing, processing can occur in the embedded processor devices of the camera, and results would be retained in a memory of the camera or written to a memory card or other memory storage device connectable to the camera. The embedded devices may be generally equivalent in function to the processor 405 of the computer 401.

The capture of multiple images of a scene with different capture parameters may be performed by capturing multiple images with a single user operation (a single depression of a capture button of the camera 427) which causes one image to be captured and stored in a memory of the camera, the parameter to be changed, for example the focus of the lens 110 being changed, and a further image to be then captured and stored in the camera memory. Such capturing may occur within approximately 0.001-1.0 seconds causing both images to include substantially the same if not identical content and thus substantial common image content upon which artificial bokeh rendering may then be performed.

In another example, a desktop computer or the like may implement the artificial bokeh processing in software to enable post-capture processing of photos to generate artificial bokeh, which a user can use for image segmentation or further image processing operations. In this case, the camera 427 would capture multiple images of a scene in a traditional fashion, the images being suitable for application of the artificial bokeh process, and the images would be retained in memory or written to a memory card or other memory storage device. At a later time, the images would be transferred to the computer (e.g. 401), where subsequent steps of the artificial bokeh process would use them as input.

In yet another example, a cloud computing server or the like may implement the artificial bokeh processing in software to enable post-capture processing of photos to generate artificial bokeh. In this case, the camera 427 would capture multiple images of a scene in a traditional fashion, but with different capture parameters. The images would be uploaded to a cloud computing server, where subsequent steps of the artificial bokeh process would receive and use them as input. The cloud computing server would produce the artificial bokeh images and may then download them back to the camera, or store them for later retrieval by the user.

Other implementations may capture two images with different camera parameters, the varying parameters being one or more of: focus, zoom, aperture, or any other camera setting that influences the amount of blur in the captured image. In the case of some parameters, such as zoom in particular but also focus and potentially other parameters, the magnification of the captured images may be different. In this case one or more of the images may be scaled to bring the images substantially into registration before applying the artificial bokeh algorithm to render an artificial bokeh image.

Figure 5A:
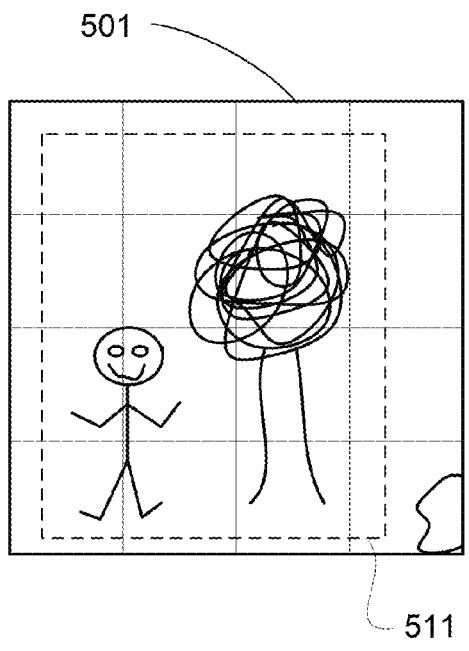
FIGS. 5A, 5B, and 5C illustrate example images upon which artificial bokeh processing according to the present disclosure may be performed.
Figure 5B:
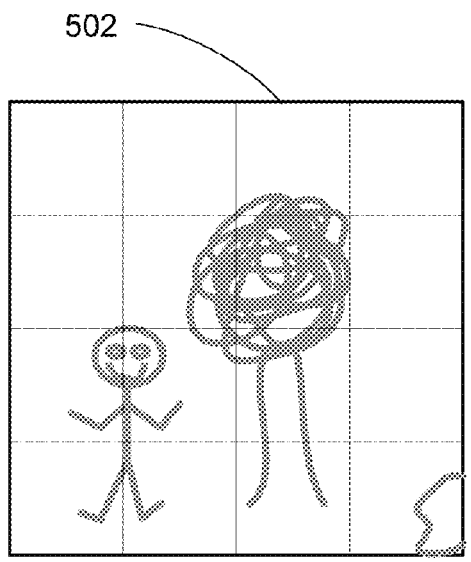

FIGS. 5A and 5B illustrate a first pair of exemplary images 501 and 502 respectively upon which the artificial bokeh processing may be performed. The scene content captured by the images 501 and 502 is identical, but the images 501 and 502 capture different image content in view of the image 502 being captured with at least one camera parameter different to the capture of image 501. For example, image 502 may be differently focused relative to the image 501.

Figure 5C:
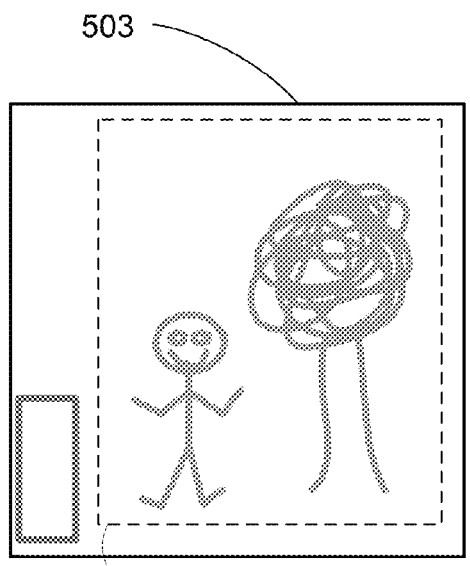

FIGS. 5A and 5C illustrate a second pair of exemplary images 501 and 503 respectively upon which artificial bokeh processing may also be performed. The scene content captured by the images 501 and 503 is not identical in total content, however the images 501 and 503 capture a scene that is common, or includes common scene content, to both images. That common scene content is indicated by dashed rectangles 511 and 513 in FIGS. 5A and 5C respectively and shows a person standing adjacent to a tree. The common scene content may appear at different positions within the images 501 and 503. The differences in position of the common scene content between the images 501 and 503 may result from, for example, slight camera movement between capture of the two images. The image content of images 501 and 503 within the regions 511 and 513 capturing common scene content may further be different in view of image 503 being captured with at least one camera parameter different to the capture of image 501. For example, image 503 may be differently focused relative to image 501.

Significantly, in each of FIGS. 5A-5C, a common part of the scene content (being the person adjacent the tree) is captured in each image. Artificial bokeh processing may therefore be performed on pairs of the images to determine a rendered artificial bokeh image for the common part. Note that FIGS. 5B and 5C may also represent an image pair upon which artificial bokeh processing may be performed.

Certain implementations may capture more than two images, with one or more pairs of the images used to render artificial bokeh images using the presently disclosed artificial bokeh algorithm.

Figure 6:
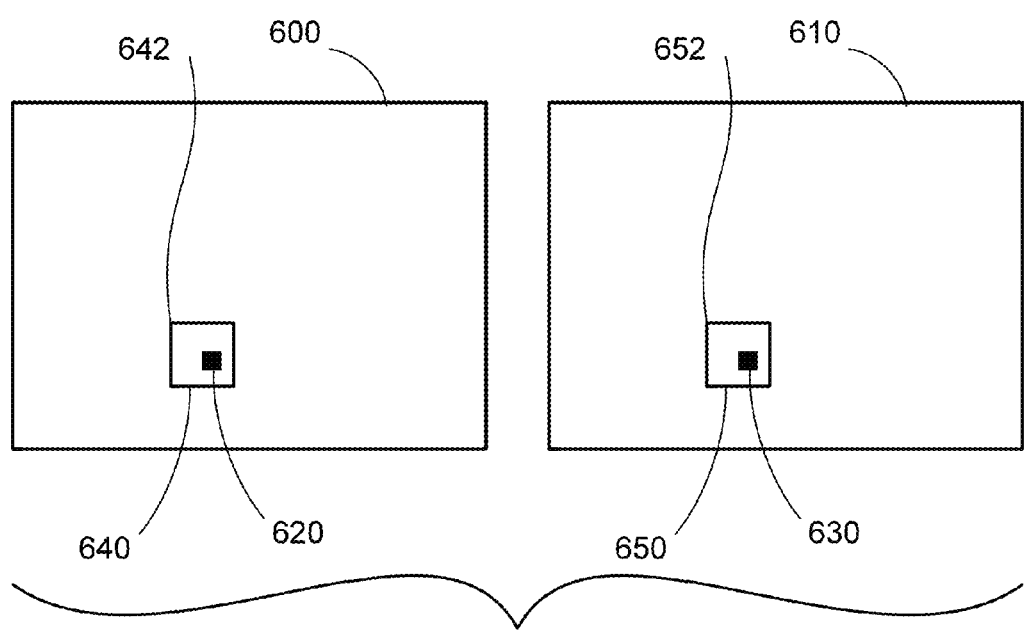
FIG. 6 is a diagram illustrating the correspondence between pixels and image patches within a first image and a second image of a scene.

A method of producing an artificial bokeh image from two images of a scene will now be described in detail with reference to FIG. 6 and FIG. 7 and the arrangements of FIGS. 4A and 4B where substantive processing occurs within the computer 401. FIG. 6 illustrates a first image 600 of a scene and a second image 610 of the same scene (not illustrated). A selected pixel 620 in the first image 600 is highlighted and a corresponding selected pixel 630 in the second image 610 is highlighted. The correspondence is such that the selected pixel 620 in the first image 600 and the selected pixel 630 in the second image 610 largely correspond to the same point in the scene being imaged. This may be achieved in practice by ensuring that no objects in the scene move in the time between the exposures used to capture the first image 600 and the second image 610 and also that the camera 427 which captures the images 600 and 610 does not move in the time between the exposures, and then selecting pixels from the same (x, y) coordinates on the image sensor. It may also be achieved by an alignment process which explicitly determines which pixels in the first image 600 correspond to pixels in the second image 610. This alignment may address issues such as motion of objects within the scene between the two exposures, motion of the camera 427 between the two exposures, and changes in the magnification or distortion or both between the two exposures. The alignment may be global across the entire images 600 and 610, local within subregions of the images 600 and 610, or both. Many such alignment processes are known to those skilled in the art.

Also shown in FIG. 6 are two image patches, which are subsets of the pixels in each image. The first image patch 640 is from the first image 600 and is referred to as $f_1$. The second image patch 650 is from the second image 610 and is referred to as $f_2$. The first patch $f_1$ 640 is defined with reference to the first selected pixel 620 in the first image 600 such that the first selected pixel 620 occurs at coordinates $(x_1, y_1)$ with respect to a pixel 642 at the upper left corner of the first patch $f_1$ 640. The second patch $f_2$ 650 is defined with reference to the selected pixel 630 in the second image 610 such that the selected pixel 630 occurs at coordinates $(x_2, y_2)$ with respect to a pixel 652 at the upper left corner of the second patch $f_2$ 650, where $(x_2, y_2)=(x_1, y_1)$. In alternative implementations it may be the case that $(x_2, y_2) \neq (x_1, y_1)$. The patches should be the same size to ensure appropriate comparison of image content contained therein.

Returning to FIGS. 5A to 5C, the patches may be formed by simple division of the images or parts of the images into blocks. In the example of the image pair 501 and 502 shown in FIGS. 5A and 5B respectively, the image content is sufficiently aligned that the patches may be formed by dividing the images into a 4×4 configuration of blocks. In the example of the image pair 501 and 503 shown in FIGS. 5A and 5C respectively, the regions 511 and 513 showing common scene content may be divided into patches in a similar blockwise manner (not illustrated). Alternatively, the patches may be formed in a manner such that the patches vary in size across the images.

Figure 7:
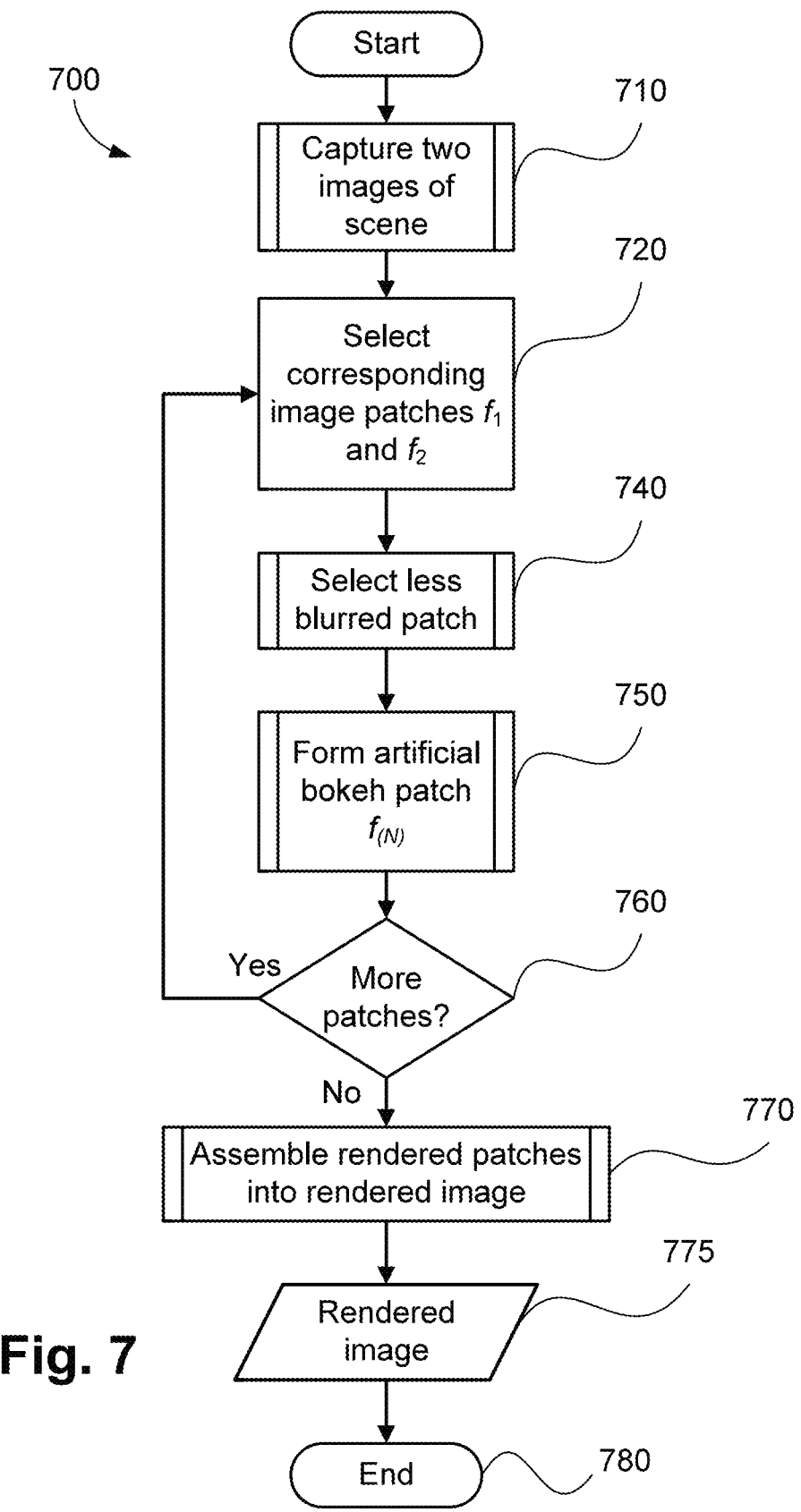
FIG. 7 is a schematic flow diagram illustrating an exemplary method of determining an artificial bokeh image from two images of a scene, according to the present disclosure.

FIG. 7 illustrates an artificial bokeh process 700 in which an artificial bokeh rendered image 775 is determined. The process 700 operates to modify the blur in at least part of an image of a scene. In an image capture step 710, two images 600 and 610 of a scene are captured by an image capture device 100, such as the camera 427. The images 600 and 610 should include image content of a common part of the scene content. For example, with reference to FIG. 1 the common part could be the object 140. In FIGS. 5A and 5C the common part is the person next to the tree, whereas in FIGS. 5A and 5B, the common part is the entirety of the images. The images are captured with at least one of the camera parameters of focus, aperture, zoom, or some other parameter that influences the amount of blur in the image being different, so that the amount of blur is different between the images. Ideally the images are captured such that any motion of the objects in the scene and any relative motion of the camera 427 with respect to the scene is minimised. For example, with reference to FIGS. 5A and 5C, which are representative of such relative motion, an alignment process may be performed on the two images to provide that the common parts as found in each image are appropriately aligned prior to artificial bokeh processing. This may involve, for example, aligning the image data within the rectangles 511 and 513 with each other, or cropping the images to those rectangles.

Figure 8:
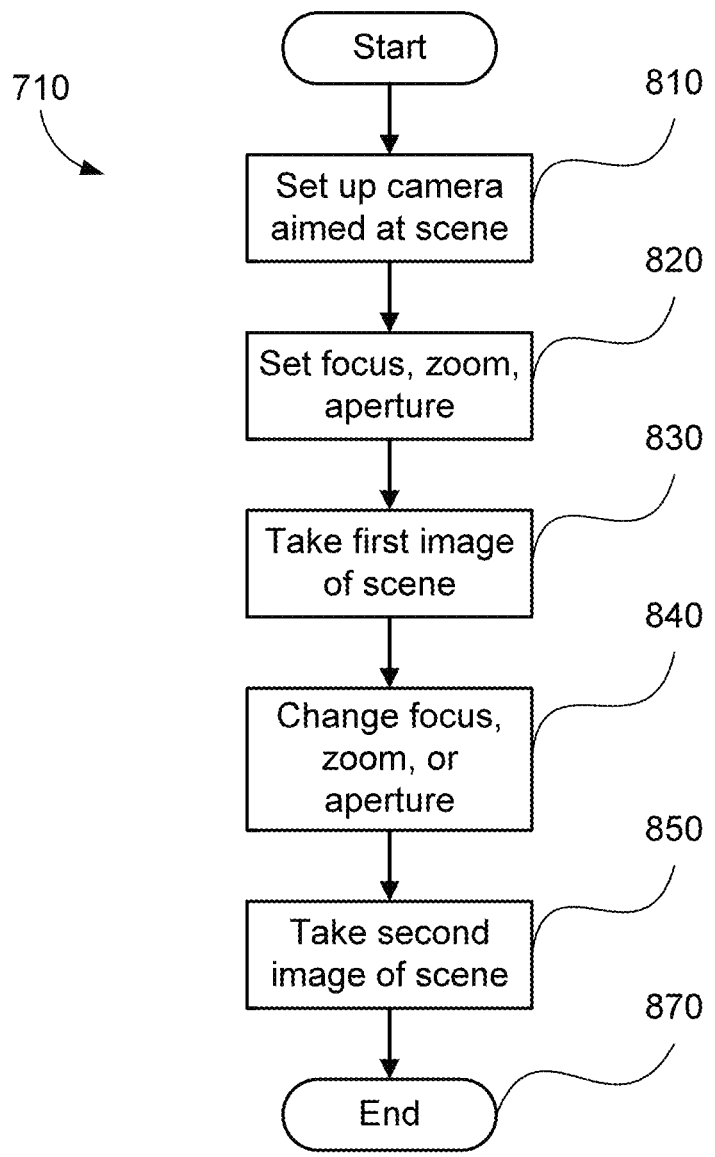
FIG. 8 is a schematic flow diagram illustrating one example of a method of capturing two images as used in the method of FIG. 7.

A specific implementation of the image capture step 710 is described in more detail below with reference to FIG. 8. Typically the images 600 and 610 are captured by the camera 427 and communicated to and received by the computer 401 for storage in one or both of the HDD 410 and memory 406. Where the process 700 is performed within the camera 427, the images 600 and 610 are stored in a memory of the camera 427 for subsequent processing by an embedded processor thereof.

Steps 720-780 of the process 700 may be preferably embodied in and implemented by an embedded processor in the camera 427. Steps 720-780 of the process 700 in the present implementation are embodied in and implemented by software, for example stored on the HDD 410 and executable by the processor 405 in concert with the memory 406. In a patch selection step 720 which follows the capture step 710, the corresponding patches $f_1$ 640 and $f_2$ 650 of the two images 600 and 610 are selected and received by the processor 405 from the memory 406.

In an asymmetric patch selection step 740 which then follows, a determination is made regarding which of the patches $f_1$ or $f_2$ is the less blurred patch of the two. Details of a specific implementation of the asymmetric patch selection step 740 will be described below with reference to FIG. 9.

An artificial bokeh rendering step 750 is then performed in which an artificial bokeh patch $f_{(N)}$ is determined by the processor 405 processing the pixel data in the first patch $f_1$ 640 and the second patch $f_2$ 650. In practice, the artificial bokeh rendering step 750 may be performed multiple times iteratively for many different pairs of input patches $f_1$ and $f_2$, thus producing a set $S\{f_{(N)}\}$ of artificial bokeh patches $f_{(N)}$, each artificial bokeh patch associated with specific input patches $f_1$ and $f_2$. The artificial bokeh patches are typically stored in the memory 406. The details of an implementation of the artificial bokeh rendering step 750 will be described below with reference to FIG. 10.

A patch decision step 760 then follows where a decision is made by the processor 405 on whether there remain any patches in the first image 600 and the second image 610 that have not yet been selected in the patch selection step 720. If there remain patches that have not yet been selected, the artificial bokeh process 700 returns to the patch selection step 720. In practice, the patches may be selected in a systematic order such as by iterating along the rows and down the columns of the first image $f_1$ 600. Accordingly, the steps 720-760 proceed for a current patch of all the patches desired to be processed for artificial bokeh purposes. Each current patch represents a current part of the common part of the scene captured by the images. In some instances, for example the image pair of FIGS. 5A and 5B, because all is common, image patches may span the entirety of the images. In an alternative approach, only a subset of the first image $f_1$ 600 may be chosen to be selected, for example by the processor 405 selecting a subset of pixels of the first image $f_1$ 600 to avoid any of the resulting patches from covering areas outside the images, thus avoiding any edge effects. In another alternative, a subset of pixels of the first image $f_1$ 600 may be chosen to be selected by some other means. Once all required patches have been selected ('NO' in step 760), the artificial bokeh process 700 continues to an assembly step 770.

In the assembly step 770, the artificial bokeh rendered patches calculated in the artificial bokeh rendering step 750 are assembled by the processor 405 to produce an artificial bokeh rendering of the scene captured by the image capture device 100. Such reveals an artificial bokeh image 775 that may be stored by the processor 405 in the memory 406 or HDD 410, and/or reproduced upon the video display 414 or by the printer 415. The details of an implementation of the assembly step 770 will be described below with reference to FIG. 11.

The artificial bokeh process 700 then ends at end step 780.

Image Capture

One example of the image capture step 710 will now be described with reference to FIG. 8. In a camera set up step 810, the image capture device (camera 427) is aimed at the desired scene. This can be done for example by aiming a hand-held camera, or by setting up a camera on a tripod.

In a camera setting step 820, various settings associated with the image capture device are set. This refers to settings that have some effect on the amount of blur recorded in the image and includes setting the lens focus position, the zoom position of the lens if it is capable of zooming, and the aperture of the lens. Other image capture device settings which change the amount of blur in the image are possible. These settings may be performed manually by the operator, or automatically by control software executing within the camera based on the scene to be captured.

A first image taking step 830 then follows, where a (first) image of the scene is captured using the settings set in the camera setting step 820.

A camera setting change step 840 follows where the settings of the image capture device are changed from the values set in the camera setting step 820. This may involve changing one or more of: the lens focus position, the lens zoom position, the lens aperture setting, and any other setting which affects the amount of blur recorded in the image. This change may be performed manually or by the camera control software.

In a second image taking step 850, a (second) image of the scene is captured using the settings set in the camera setting change step 840. The image capture process 710 then ends at end step 870.

In one implementation, the first image taking step 830, the camera setting change step 840, and the second image taking step 850 are performed automatically by the image capture device 100 in response to a single activation of an image capture function of the device 100, for example pressing the shutter button on a camera.

Asymmetric Patch Selection

Figure 9:
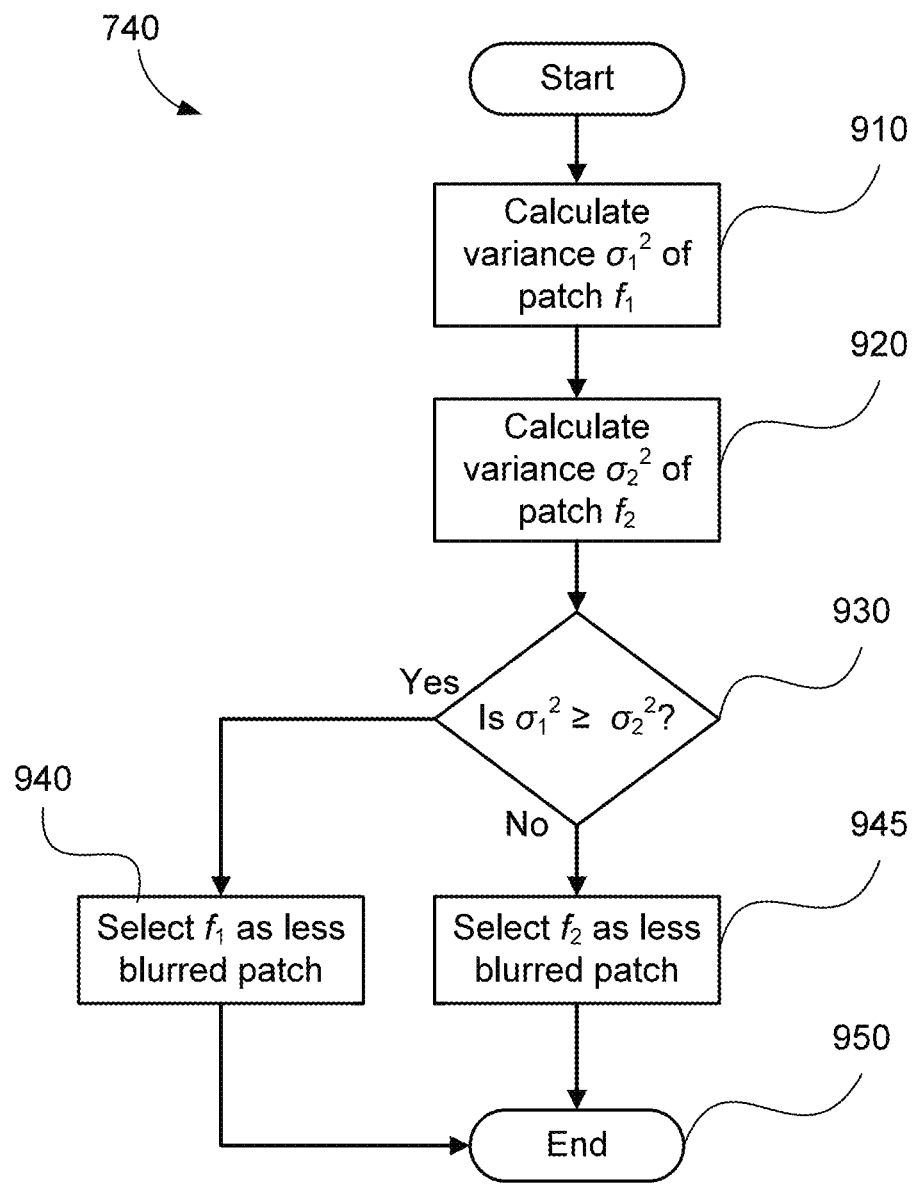
FIG. 9 is a schematic flow diagram illustrating one example of a method of asymmetrical patch selection as used in the method of FIG. 7.

One implementation of the asymmetric patch selection step 740 will now be described with reference to FIG. 9. The asymmetric patch selection process 740 begins with the first image patch $f_1$ 620 and the second image patch $f_2$ 640 as data inputs.

In a first variance calculation step 910, the variance $\sigma_1^2$ of the pixel values in the patch $f_1$ 620 is calculated, using the well-known definition of variance. In a second variance calculation step 920, the variance $\sigma_2^2$ of the pixel values in the patch $f_2$ 640 is calculated.

In a variance comparison step 930, the variance $\sigma_1^2$ of the pixel values in patch $f_1$ 620 is compared to the variance $\sigma_2^2$ of the pixel values in patch $f_2$ 640. If the variance $\sigma_1^2$ of the pixel values in patch $f_1$ 620 is greater than or equal to the variance $\sigma_2^2$ of the pixel values in patch $f_2$ 640, processing continues with a first patch selection step 940. On the other hand, if the variance $\sigma_1^2$ of the pixel values in patch $f_1$ 620 is less than the variance $\sigma_2^2$ of the pixel values in patch $f_2$ 640, processing continues to a second patch selection step 945.

In the first patch selection step 940, patch $f_1$ is selected as the less blurred patch. In the second patch selection step 945, patch $f_2$ is selected as the less blurred patch. The asymmetric patch selection process 740 then ends at end step 950.

Other approaches to performing the asymmetric patch selection step 740 are possible. For example, the patches may first be smoothed using a filter to reduce the effects of outlying pixel values caused by imaging noise. The variances of the filtered patches may then be calculated, and the patch with the highest variance after filtering may then be selected as the less blurred patch. In another example, a two-dimensional gradient operator, such as the Laplacian operator, may be applied to the patches, and then the patch with the greatest range of pixel values (i.e. maximum pixel value minus minimum pixel value) in the Laplacian gradient image may be selected as the less blurred patch. In another example, it may be known that the two images 600 and 610 were captured with the aperture value being the only parameter changed between the captures, in which case the patch from the image captured with the narrower aperture may simply be selected as the less blurred patch.

Artificial Bokeh Rendering

Figure 10:
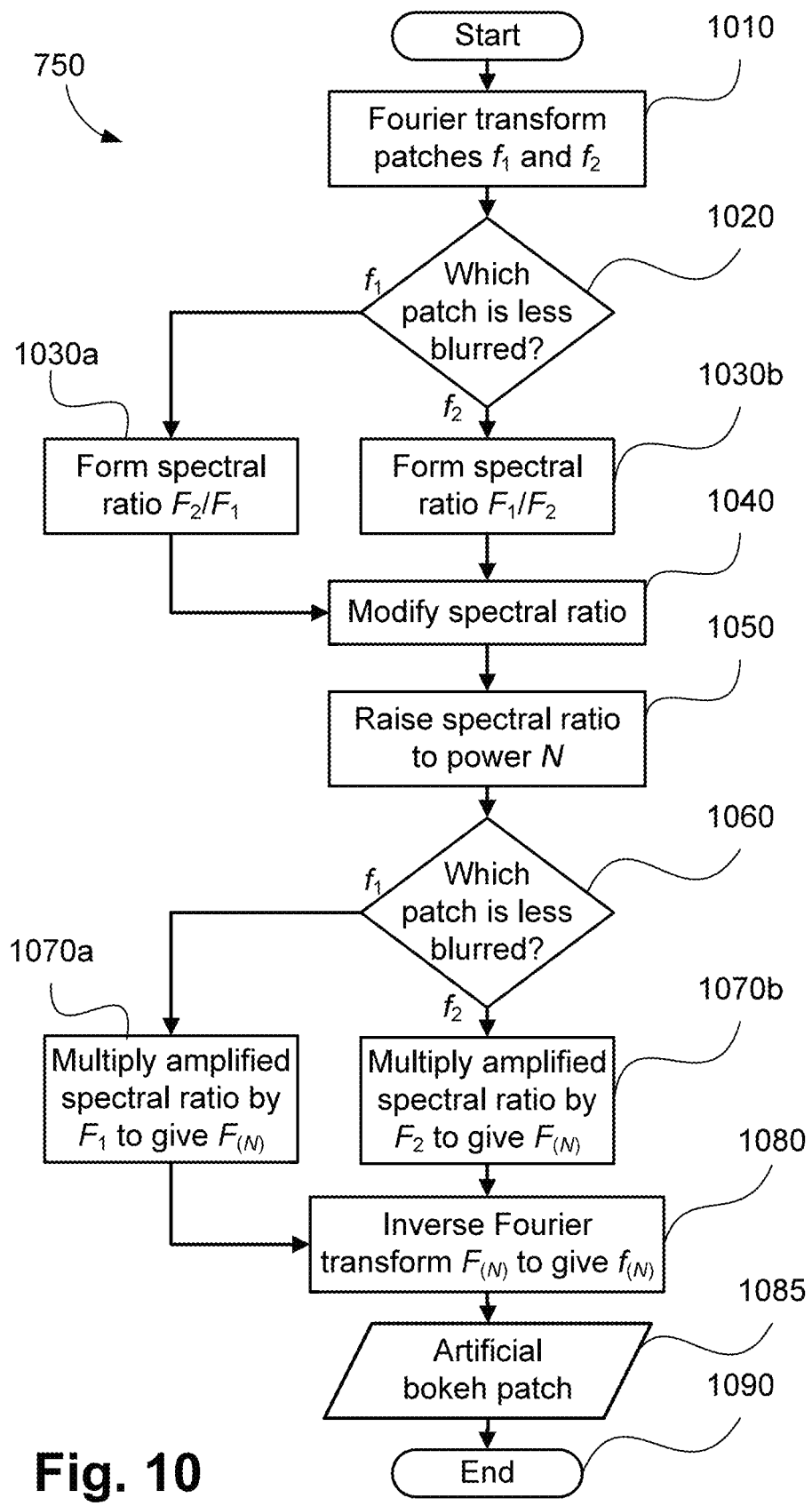
FIG. 10 is a schematic flow diagram illustrating one example of a method of determining an artificial bokeh image patch from two corresponding patches of two images of a scene as used in the method of FIG. 7.

One implementation of the artificial bokeh rendering step 750 will now be described with reference to FIG. 10. The artificial bokeh rendering process 750 begins with the image patch $f_1$ 620 and the image patch $f_2$ 640 as data inputs. In a Fourier transform step 1010, the patches $f_1$ and $f_2$ are Fourier transformed, for example using a Fast Fourier Transform (FFT) algorithm, to form Fourier transformed patches $F_1$ and $F_2$ respectively. The Fourier transformed image patches $F_1$ and $F_2$ will contain complex number values at each pixel.

A first blur determination step 1020 follows where reference is made to which of the patches $f_1$ or $f_2$ was selected as the less blurred patch in asymmetric patch selection step 740. If the image patch $f_1$ 620 was selected as the less blurred patch, the artificial bokeh rendering process 750 continues to a first spectral ratio step 1030a. On the other hand, if the image patch $f_2$ 630 was selected as the less blurred patch, the artificial bokeh rendering process 750 continues to a second spectral ratio step 1030b.

In the first spectral ratio step 1030a, the Fourier transformed patches $F_1$ and $F_2$ are divided pixel-wise to form the spectral ratio image patch $F_2/F_1$, using complex number division. In the second spectral ratio step 1030b, the Fourier transformed patches $F_1$ and $F_2$ are divided pixel-wise to form the spectral ratio image patch $F_1/F_2$, using complex number division. In both of the spectral ratio steps 1030a and 1030b, the Fourier transformed patch in the denominator of the formed ratio is the Fourier transformed patch of the image patch determined to be the least blurred. As such, a combination of data from the first and second patches is used to calculate at least one Fourier transform value which in turn is based on the determination in the asymmetric patch selection step 740 of which of the patches is the more focussed image patch.

In a modification step 1040, the spectral ratio formed in step 1030a or step 1030b is modified by a normalisation process, by dividing by the value of the DC pixel of the spectral ratio, forming a normalized spectral ratio. In a variation of the modification step 1040, the spectral ratio is first filtered with a smoothing filter to remove outlying pixel values, before dividing by the value of the DC pixel of the smoothed spectral ratio to achieve the normalisation. The smoothing filter may be a median filter, a Gaussian filter, or some other filter. In another variation of the modification step 1040, the spectral ratio is weighted on a per-pixel basis by multiplication by a weighting function determined by the values of the complex phases of the pixels of the spectral ratio, before dividing by the value of the DC pixel of the weighted spectral ratio to achieve the normalisation.

A result of steps 1010-1040 is the calculation of a set of frequency domain pixel values from a combined function of Fourier transforms of two of the selected image patches.

In an exponentiation step 1050, the normalized spectral ratio is raised to a predetermined power N, in a pixel-wise fashion, using complex arithmetic, forming an amplified spectral ratio.

A second blur determination step 1060 follows where reference is made to which of the patches $f_1$ or $f_2$ was selected as the less blurred patch in asymmetric patch selection step 740. If the image patch $f_1$ 620 was selected as the less blurred patch, the artificial bokeh rendering process 750 continues to a first multiplication step 1070a. On the other hand, if the image patch $f_2$ 630 was selected as the less blurred patch, the artificial bokeh rendering process 750 continues to a second multiplication step 1070b.

In the first multiplication step 1070a, the amplified spectral ratio is multiplied by the Fourier transform $F_1$ of patch $f_1$, forming the Fourier domain patch $F_{(N)}$. In the second multiplication step 1070b, the amplified spectral ratio is multiplied by the Fourier transform $F_2$ of patch $f_2$, forming the Fourier domain patch $F_{(N)}$.

In an inverse transform step 1080, the Fourier domain patch $F_{(N)}$ is inverse Fourier transformed, for example using an FFT algorithm, to form the artificial bokeh patch $f_{(N)}$ 1085.

The artificial bokeh rendering process 750 then ends at end step 1090.

In a preferred implementation, the patch 1085 contains pixels with blur modified with respect to the initial amount of blur in the image patch, in which the amount of modification with respect to blur varies across different regions of the image patch.

Specifically, the input pair of image patches $f_1$ and $f_2$ will in general contain pixels representing various different objects or parts of objects within the scene. These objects or parts of objects will in general be at differing distances from the camera. The processing steps of the artificial bokeh rendering process 750 described above, when applied to a single pair of input patches, will produce an artificial bokeh patch 1085 in which the objects at differing distances from the camera are blurred by different amounts, according to the theory described in the section "Application to artificial bokeh" above.

Image Assembly

The artificial bokeh patches are desirably assembled into an image such that there is a geometric correspondence between the patch locations of each patch selected in the patch selection step 720 and the corresponding artificial bokeh patches that are calculated from those patches in the artificial bokeh rendering step 750. For example, if the first image 600 is 100×100 pixels and patches of 10×10 pixels are selected by iterating adjoining patches across rows and down columns, then the consecutive artificial bokeh rendered patches can be assembled by tiling them into an image 100× 100 pixels in size by inserting the rendered patches into successive 10×10 blocks of pixels, iterating across rows and down columns. In general, the image assembly step 770 may be more complex than this, and is described below.

Figure 11:
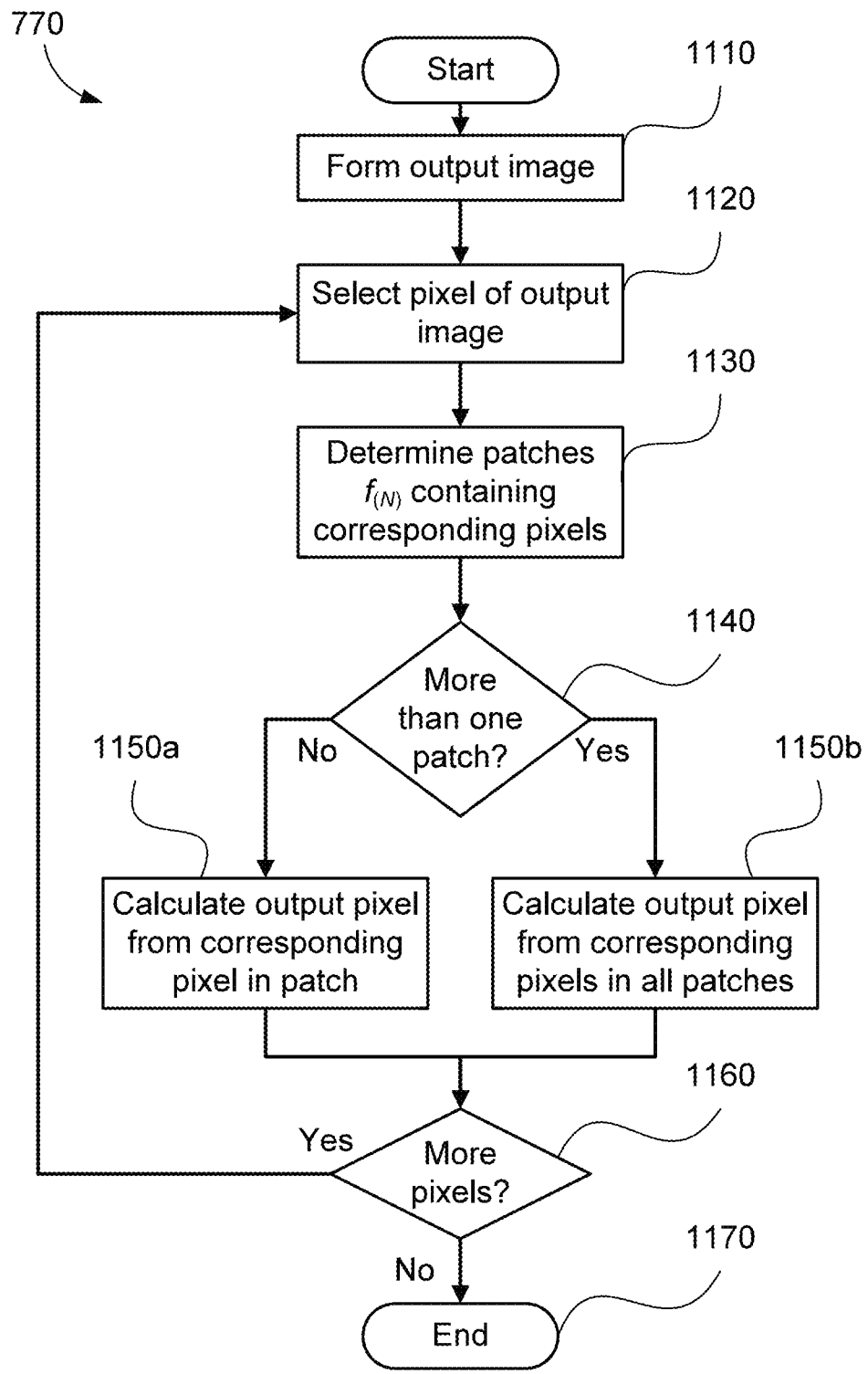
FIG. 11 is a schematic flow diagram illustrating one example of a method of assembling artificial bokeh patches into an artificial bokeh image as used in the method of FIG. 7.

One implementation of the image assembly step 770 will now be described with reference to FIG. 11. The input to the image assembly process is the set $S\{_{(N)}\}$ of all of the artificial bokeh patches $f_{(N)}$ produced by the iterations of the artificial bokeh step 750.

The image assembly process begins with an output image formation step 1110, in which an output image is formed, ready to hold pixel values of the artificial bokeh image. The output image is preferably an image of pixel size equal to the input images captured in image capture step 710. The output image may alternatively be of a different size to the input images, such as with a number of pixels trimmed from the borders. The pixel coordinates $(x_o, y_o)$ of the output image are related to the pixel coordinates $(x_{ik}, y_{ik})$ of the kth input image by a relation $$(x_o, y_o) + (n_{xk}, n_{yk}) = (x_{ik}, y_{ik}) \qquad (10)$$

for some fixed pair of integers $(n_{xk}, n_{yk})$. If there is no shift between the input images, then $(n_{xk}, n_{yk})$ is the same for all k input images, but this may not be true in the case when there is motion shift between the input images.

In a pixel selection step 1120, a pixel $p_o$ of the output image is selected, with coordinates $(x_o, y_o)$. The selected pixel $p_o$ is a pixel that has not previously been selected by an earlier iteration of step 1120. In practice, all of the pixels in the output image may be selected in successive iterations of step 1120 by iterating across rows and down columns. Pixels $p_{ik}$ in each of the input images are defined with respect to $p_o$ by equation (10).

In a patch determining step 1130, it is determined which artificial bokeh patches $f_{(N)}$ from the set of patches $S\{f_{(N)}\}$ calculated in artificial bokeh rendering step 750 were calculated using input patches containing the pixels $p_{ik}$ corresponding to the output image pixel $p_o$ selected in pixel selection step 1120. In other words, which of the patches $f_{(N)}$ were calculated from patches $f_1$ and $f_2$ of the original images which contain the pixels $p_{ik}$ with coordinates $(x_{ik}, y_{ik})$ satisfying equation (10). The patches $f_{(N)}$ that are determined to satisfy this condition are placed in a subset $T\{f_{(N)}\}$ of patches.

In a patch counting step 1140, a decision is made based on whether the subset $T\{f_{(N)}\}$ of patches determined in patch determining step 1130 contains more than one patch. If the subset $T\{f_{(N)}\}$ contains exactly one patch, processing continues with a first output calculation step 1150*a*. Alternatively, if the subset $T\{f_{(N)}\}$ contains more than one patch, processing continues with a second output calculation step 1150*b*. The case where the subset $T\{f_{(N)}\}$ contains no patches should not occur if the output image formed in output image formation step 1110 is sized appropriately.

In the first output calculation step 1150*a*, the output pixel $p_o$ is assigned the value of the corresponding pixel from the patch $f_{(N)}$ which is the only member of the subset $T\{f_{(N)}\}$ of patches determined in patch determining step 1130. The correspondence is determined with reference to the input image patches $f_1$ and $f_2$ of the original images and equation (10).

In the second output calculation step 1150*b*, the output pixel $p_o$ is assigned a value calculated from the values of the corresponding pixels $p^T$ from each of the patches $f_{(N)}$ which are members of the subset $T\{f_{(N)}\}$ of patches determined in patch determining step 1130. The correspondence is determined with reference to the input image patches $f_1$ and $f_2$ of the original images and equation (10). The value of the pixel $p_o$ may be assigned by some mathematical combination of the values of the pixels $p^T$, for example the mean of the values of the pixels $p^T$. In an alternative implementation, the value of the pixel $p_o$ may be assigned the median of the values of the pixels $p^T$. In another alternative implementation, the value of the pixel $p_o$ may be assigned the mean or median of a subset of the values of the pixels $p^T$ after some values are rejected as outliers by some statistical method.

In a pixel decision step 1160, a decision is made based on whether there are more pixels remaining in the output image that have not yet been assigned values by either the first output calculation step 1150*a* or the second output calculation step 1150*b*. If more pixels remain to be assigned values, processing returns to the pixel selection step 1120. If no more pixels remain to be assigned values, the image assembly process 770 terminates at the end step 1170.

EXAMPLE 2

Figure 12:
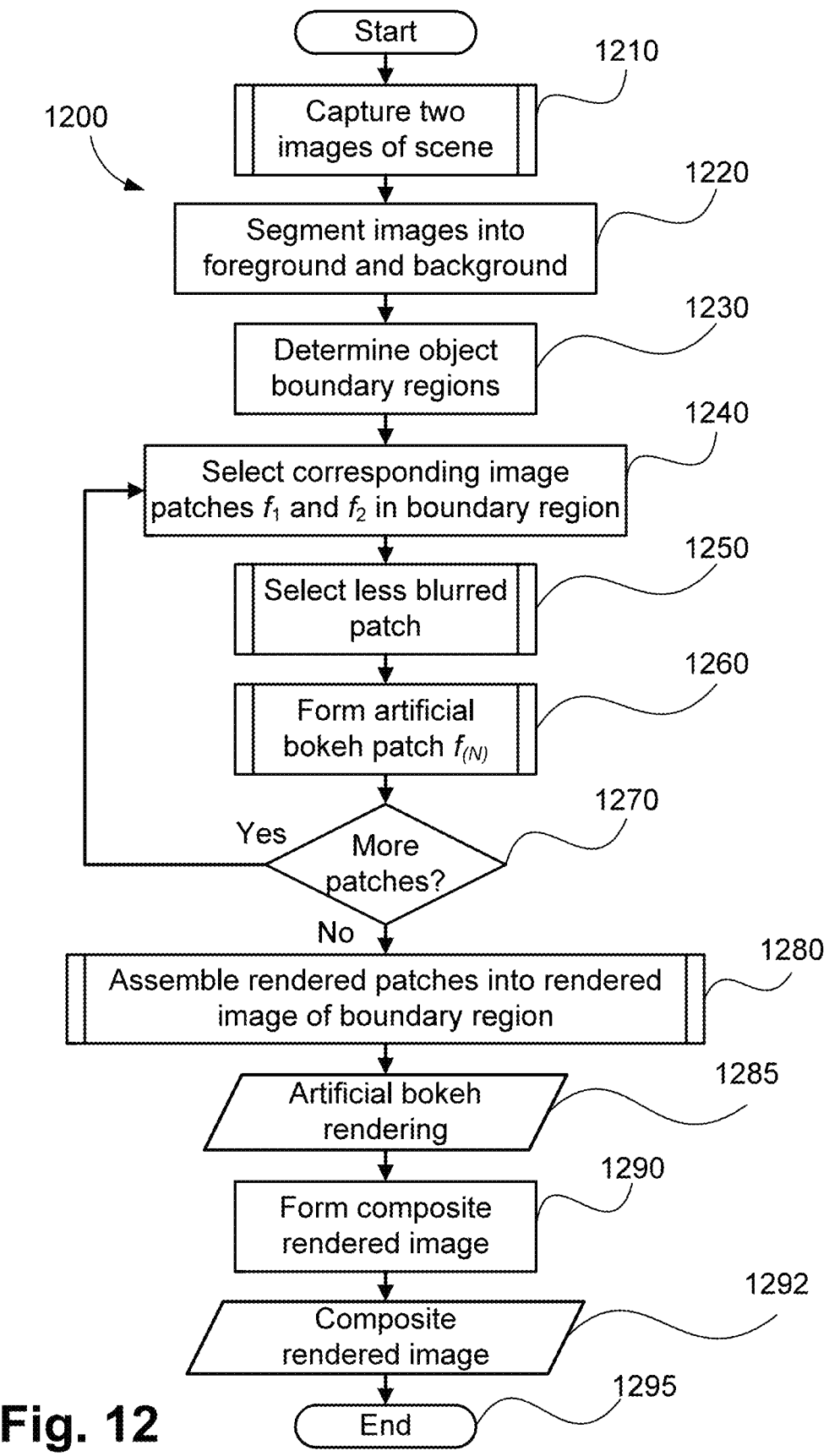
FIG. 12 is a schematic flow diagram illustrating a second exemplary method of determining an artificial bokeh image from two images of a scene, according to the present disclosure.

FIG. 12 illustrates an artificial bokeh process 1200 in which an artificial bokeh rendered image is determined. In an image capture step 1210, two images 600 and 610 of a scene are captured by an image capture device 100, such as the camera 427. The images 600 and 610 should include image content of a common part of the scene content, as described previously. A specific implementation of the image capture step 1210 is the method 710 described above with reference to FIG. 8.

Steps 1220-1290 of the process 1200 are preferably embodied in and implemented by an embedded processor in the camera 427. Steps 1220-1290 of the process 1200 may also be embodied in and implemented by software, for example stored on the HDD 410 and executable by the processor 405 in concert with the memory 406.

In a segmentation step 1220, at least one of the two images 600 and 610 are segmented into foreground and background regions, preferably such that the foreground region generally comprises image regions corresponding to objects close to the focal plane, while the background region generally comprises image regions corresponding to objects far from the focal plane. Note that the background region can include image regions between the focal plane and the camera (in the relatively extreme foreground), as well as those beyond the focal plane. In this regard, 'background' is intended to cover those objects or regions of the captured image that are not the subject of the photograph. Typically this includes ordinary background objects, but can include near foreground objects. For example, the images may be segmented by applying a DFD algorithm to the images to produce a depth map, followed by thresholding the resulting depth map to produce a binary segmentation. Several such binary depth segmentation methods are known in the art, though they often have poor accuracy around the object boundaries.

In a boundary determination step 1230, a boundary region between the foreground and background regions is determined. For example, the boundary region may be determined by selecting all pixels within a predetermined radius r of the segmentation edge between the foreground and background regions. Preferably, the radius r is a size close to the maximum expected error in the location of the boundary between the foreground and background regions produced in segmentation step 1220, in pixels, plus the size of the patches used in steps 1240-1280. The boundary region should separate the foreground and background regions, and may be disjoint if there are several objects in the images.

In a patch selection step 1240, the corresponding patches $f_1$ 640 and $f_2$ 650 of the two images 600 and 610 are selected and received by the processor 405 from the memory 406. In this implementation, the selected patches $f_1$ 640 and $f_2$ 650 need only cover the boundary region determined in step 1230. Patches which do not contain pixels in the boundary region are not selected.

In an asymmetric patch selection step 1250 which then follows, a determination is made regarding which of the patches $f_1$ or $f_2$ is the less blurred patch of the two. Details of a specific implementation of the asymmetric patch selection step 1250 are described above with reference to the method 740 of FIG. 9.

An artificial bokeh rendering step 1260 is then performed in which an artificial bokeh patch $f_{(N)}$ is determined by the processor 405 processing the pixel data in the first patch $f_1$ 640 and the second patch $f_2$ 650. In practice, the artificial bokeh rendering step 1260 may be performed multiple times iteratively for many different pairs of input patches $f_1$ and $f_2$, thus producing a set $S\{f_{(N)}\}$ of artificial bokeh patches $f_{(N)}$, each artificial bokeh patch associated with specific input patches $f_1$ and $f_2$. The artificial bokeh patches are typically stored in the memory 406. The details of an exemplary implementation of the artificial bokeh rendering step 1260 are described above with reference to the method 750 of FIG. 10.

A patch decision step 1270 then follows where a decision is made by the processor 405 on whether there remain any patches in the first image 600 and the second image 610 which include pixels in the boundary region determined in step 1230, and that have not yet been selected in the patch selection step 1240. If there remain patches that have not yet been selected, the artificial bokeh process 1200 returns to the patch selection step 1240. Accordingly, the steps 1250-1270 proceed for a current patch of all the patches which contain pixels in the boundary region. Once all required patches have been selected ('NO' in step 1270), the artificial bokeh process 1200 continues to an assembly step 1280.

In the assembly step 1280, the artificial bokeh rendered patches calculated in the artificial bokeh rendering step 1260 are assembled by the processor 405 to produce an artificial bokeh rendering 1285 of the boundary region determined in step 1230. The details of an exemplary implementation of the assembly step 1280 are described above with reference to the method 770 of FIG. 11, noting that the assembly 1280 produces pixels only within the boundary region.

In a composite image step 1290, the artificial bokeh rendering 1285 assembled in step 1280 is combined with the foreground and background regions determined in step 1220 to form a composite rendered image 1292. Before combination, the background region may be blurred by convolution with a blur kernel. The foreground, blurred background, and artificial bokeh rendered boundary regions are then composited to produce a single image 1292. Such reveals an artificial bokeh image that may be stored by the processor 405 in the memory 406 or HDD 410.

The artificial bokeh process 1200 then ends at end step 1295.

Variations and User Cases

Many variations of the processes of FIGS. 7, 8, 9, 10, 11, and 12 may be performed. For example, the processes may be applied to different colour channels of the input image patches, thereby calculating separate artificial bokeh images for each colour channel, which may then be combined, for example using demosaicing algorithms known to those skilled in the art, to produce a colour artificial bokeh image.

In another variation, the processes may be applied to a luminance channel and colour difference channels of the input image patches, thereby calculating separate artificial bokeh images for the luminance channel and colour difference channels, which may then be combined to produce a colour artificial bokeh image.

In another variation, the processes may be applied to a luminance channel of the input image patches, thereby calculating an artificial bokeh images for the luminance channel, which may then be combined with unprocessed colour difference channels to produce a colour artificial bokeh image.

In another variation, multiple artificial bokeh pixel values may be calculated from each pair of input image patches by using different variations of the processes. Then final pixel values may be obtained from the multiple values, averaged or combined in some other manner, or selected from using some selection criterion, to give a final output artificial bokeh image.

INDUSTRIAL APPLICABILITY

The arrangements described are applicable to the computer and data processing industries and particularly for the processing of images captured by cameras having a large depth of field, to thereby emulate capture by a camera having a narrow depth of field. The arrangements disclosed therefore have specific utility in the processing of images captured by so-called "compact" digital cameras, and operate to amplify any bokeh present in the captured images. This bokeh amplification can make a compact camera emulate an SLR camera.

The foregoing describes only some embodiments of the present invention, and modifications and/or changes can be made thereto without departing from the scope and spirit of the invention, the embodiments being illustrative and not restrictive.

We claim:

1. A method of modifying blur in at least a part of an image of a scene, said method comprising:
    capturing at least two images of the scene, said images being captured with different camera parameters to produce a different amount of blur in each of the captured images;
    selecting a corresponding image patch in each of the captured images, each of the selected image patches having an initial amount of blur;
    calculating a set of frequency domain pixel values from a combined function of Fourier transforms of two of the selected image patches;
    raising each of the pixel values in the set of frequency domain pixel values to a predetermined power, thereby forming an amplified set of frequency domain pixel values; and
    combining the amplified set of frequency domain pixel values with the pixels of the selected image patch in one of the captured images to produce an output image patch with blur modified with respect to the initial amount of blur in the image patch, wherein the amount of modification with respect to blur varies across different regions of the image patch.

2. A method according to claim 1, wherein the set of frequency domain pixel values are modified before being raised to the predetermined power.

3. A method according to claim 2, wherein the modification includes a median filtering operation.

4. A method according to claim 2, wherein the modification includes a smoothing filtering operation.

5. A method according to claim 2, wherein the modification includes a normalisation operation.

6. A method according to claim 2, wherein the modification includes a weighting operation.

7. A method according to claim 6, wherein weights for the weighting operation are determined by the phases of the set of frequency domain pixel values.

8. A method according to claim 1, wherein:
    the at least two images of the scene are divided into a plurality of corresponding image patches in each of the captured images; and the output image patches are combined to produce an output image.

9. A method according to claim 8, wherein the plurality of corresponding image patches in each of the captured images form a tiling substantially covering the area of the captured images, and the output image is formed by tiling the output image patches.

10. A method according to claim 8, wherein the plurality of corresponding image patches in each of the captured images overlap, and the output image is formed by combining the pixel values of the output image patches.

11. A method according to claim 8, wherein:
the plurality of corresponding image patches in each of the captured images cover part of the area of the captured images; and
the output image patches are combined with the area of at least one of the captured images not covered by the plurality of corresponding image patches to produce an output image.

12. A method according to claim 11, wherein at least part of the area of the at least one of the captured images not covered by the plurality of corresponding image patches is blurred by convolution with a blur kernel.

13. A camera comprising an image capture system coupled to memory in which captured images are stored, a processor, and a program executable by the processor to modify blur in at least a part of an image of a scene, said program comprising:
code for causing the capture system to capture at least two images of the scene, said images being captured with different camera parameters to produce a different amount of blur in each of the captured images;
code for selecting a corresponding image patch in each of the captured images, each of the selected image patches having an initial amount of blur;
code for calculating a set of frequency domain pixel values from a combined function of Fourier transforms of two of the selected image patches;
code for raising each of the pixel values in the set of frequency domain pixel values to a predetermined power, thereby forming an amplified set of frequency domain pixel values; and
code for combining the amplified set of frequency domain pixel values with the pixels of the selected image patch in one of the captured images to produce an output image patch with blur modified with respect to the initial amount of blur in the image patch, wherein the amount of modification with respect to blur varies across different regions of the image patch.

14. A camera system comprising:
a lens formed of optics producing a relatively large depth of field;
a sensor configured to capture an image of a scene focussed through the lens;
a memory in which images captured by the sensor are stored;
a capture mechanism configured to capture at least two images of the scene with different capture parameters and to store the images in the memory;
a processor;
a program stored in the memory and executable by the processor to modify blur in at least a part of one of the captured images of the scene, said program comprising:
code for causing the capture system to capture at least two images of the scene with different camera parameters to produce a different amount of blur in each of the captured images;
code for selecting a corresponding image patch in each of the captured images, each of the selected image patches having an initial amount of blur;
code for calculating a set of frequency domain pixel values from a combined function of Fourier transforms of two of the selected image patches;
code for raising each of the pixel values in the set of frequency domain pixel values to a predetermined power, thereby forming an amplified set of frequency domain pixel values; and
code for combining the amplified set of frequency domain pixel values with the pixels of the selected image patch in one of the captured images to produce an output image patch with blur modified with respect to the initial amount of blur in the image patch, wherein the amount of modification with respect to blur varies across different regions of the image patch.

15. A non-transitory computer readable storage medium having a program recorded thereon, the program being executable by a processor to modify blur in at least a part of an image of a scene, said program comprising:
code for receiving at least two images of the scene, said images being captured with different camera parameters to produce a different amount of blur in each of the captured images;
code for selecting a corresponding image patch in each of the captured images, each of the selected image patches having an initial amount of blur;
code for calculating a set of frequency domain pixel values from a combined function of Fourier transforms of two of the selected image patches;
code for raising each of the pixel values in the set of frequency domain pixel values to a predetermined power, thereby forming an amplified set of frequency domain pixel values; and
code for combining the amplified set of frequency domain pixel values with the pixels of the selected image patch in one of the captured images to produce an output image patch with blur modified with respect to the initial amount of blur in the image patch, wherein the amount of modification with respect to blur varies across different regions of the image patch.

* * * * *